US012372228B2

(12) United States Patent
Enos et al.

(10) Patent No.: US 12,372,228 B2
(45) Date of Patent: Jul. 29, 2025

(54) LIGHTING FIXTURE ARRANGEMENT, AN ADJUSTABLE LIGHTING FIXTURE CONNECTOR, AND A METHOD OF INSTALLING A LIGHTING FIXTURE ARRANGEMENT

(71) Applicant: Camman Industries, Inc., Derry, PA (US)

(72) Inventors: Keith B. Enos, Derry, PA (US); Kenneth E. Cole, New Alexandria, PA (US); Brian R. Charney, Irwin, PA (US); Patrick N. Reeves, New Alexandria, PA (US); William J. Kubiak, New Alexandria, PA (US); Brian W. Mears, Claridge, PA (US)

(*) Notice: Subject to any disclaimer, the term of this patent is extended or adjusted under 35 U.S.C. 154(b) by 0 days.

(21) Appl. No.: 18/241,461

(22) Filed: Sep. 1, 2023

(65) Prior Publication Data

US 2024/0077193 A1 Mar. 7, 2024

Related U.S. Application Data

(60) Provisional application No. 63/403,507, filed on Sep. 2, 2022.

(51) Int. Cl.

| | |
|---|---|
| ***F21V 23/06*** | (2006.01) |
| ***F21S 8/06*** | (2006.01) |
| ***F21V 21/005*** | (2006.01) |
| *F21W 131/402* | (2006.01) |
| *F21Y 103/20* | (2016.01) |

(52) U.S. Cl.

CPC ............ *F21V 23/06* (2013.01); *F21V 21/005* (2013.01); *F21S 8/06* (2013.01); *F21W 2131/402* (2013.01); *F21Y 2103/20* (2016.08)

(58) Field of Classification Search

CPC .. F21S 8/046; F21S 8/043; F21S 8/06; F21W 2131/40; F21Y 2103/00; F21V 23/06

See application file for complete search history.

(56) References Cited

U.S. PATENT DOCUMENTS 11,255,515 B2 * 2/2022 Daly ........................ F21V 21/30

FOREIGN PATENT DOCUMENTS

CA 3147269 A1 * 2/2020

OTHER PUBLICATIONS

Innovation Q+ NPL (Year: 2024).*

* cited by examiner

*Primary Examiner* — Anabel Ton

(57) ABSTRACT

A lighting fixture arrangement, an adjustable lighting fixture connector, and a method of installing a lighting fixture arrangement.

12 Claims, 21 Drawing Sheets

224

224

223

223

1

1

222

222

221

221

220

220

210

210

200

200

LIGHTING FIXTURE ARRANGEMENT, AN ADJUSTABLE LIGHTING FIXTURE CONNECTOR, AND A METHOD OF INSTALLING A LIGHTING FIXTURE ARRANGEMENT

CROSS-REFERENCE TO RELATED APPLICATIONS

The present application claims the benefit of U.S. Provisional Patent Application No. 63/403,507, filed Sep. 2, 2022, which is incorporated by reference herein in its entirety.

BACKGROUND INFORMATION

1. Technical Field

The present application relates to a lighting fixture arrangement, an adjustable lighting fixture connector, and a method of installing a lighting fixture arrangement.

2. Background Art

This section is for informational purposes only and does not necessarily admit that any publications discussed or referred to herein, if any, are prior art.

Lighting fixtures are used to illuminate interior and exterior spaces. Many interior lighting fixtures are designed to produce an aesthetic effect coordinated with the rest of the interior decor.

Lighting fixtures come in all shapes and sizes. In residential settings, the lighting fixtures could be simple flush or semi-flush mounted ceiling lights, wall sconces, vanity lights, or free-standing lamp structures, or more complex designs such as chandeliers, pendant lights, and track lighting. In office or commercial settings, residential style lighting is also used, but often the size and type of lighting fixtures differ. For example, larger, elongated installations are often used to illuminate much larger areas in commercial settings. Usually recessed or flush-mounted wall and ceiling fixtures are used, but it is also common to use suspended fixtures, especially if a particular decorative or aesthetic effect is to be achieved. Such suspended fixtures can be shaped and arranged in a particular manner, and even custom-designed according to a requested specification of a customer.

One common type of suspended lighting fixture includes an elongated housing having a generally rod or bar shape. Light is usually produced along the length of such fixtures, often using lights or a lighting structure attached to a lower side of the housing facing toward the interior and floor of the room. Such lighting fixtures are usually suspended from the ceiling of a room by support structures in the form of tubes, cables, or wires, which can be solid or flexible. The support structures can function as a suspension or support for the housing, or can also incorporate wiring or similar to transmit power to the lighting fixture, or can perform both functions.

The elongated lighting fixtures can be assembled or joined or positioned together to form an overall design, such as a polygonal or angular design, to create a desired appearance having both aesthetic and functional features. In order to arrange the lighting fixtures and fix them in position with respect to one another, lighting fixture connectors, or simply “connectors” herein, are used to connect the ends of the lighting fixtures to one another. Such connectors usually have connector brackets or projections or similar that orient the light fixtures at one fixed angle, such as 45, 60, or 90 degrees, or another angle as desired. Some connectors are adjustable to permit the light fixtures to be set at more than one angle as desired.

SUMMARY

In accordance with at least one possible exemplary embodiment, an adjustable connector can be used to adjust the angular orientation of light fixtures. In accordance with at least one possible exemplary embodiment, the adjustable connector can be adjusted to orient two light fixtures at any angle in the range of about 90 to about 170 degrees. The adjustable connector can be fixed in position to place two light fixtures at a desired angle in that range, and can be re-adjusted and re-fixed at another desired angle. In accordance with at least one possible exemplary embodiment, the adjustable connector includes a channel or passage to permit lines or wiring to pass therethrough in order to permit the transfer of power from a power source, through a first lighting fixture, and then to at least a second lighting fixture in a connection setup known as daisy-chaining. The adjustable connector further includes a stop structure or similar in order to protect wiring therein from being damaged during adjustment of the adjustable connector over the entire range of adjustment. The wiring can safely pass through the adjustable connector regardless of the angular adjustment of the adjustable connector.

In accordance with at least one possible exemplary embodiment, the adjustable connector permits custom adjustments to any angle in the range of 90 degrees to 170 degrees. Such adjustability allows the installation of multiple light fixtures at varying angles to produce a desired aesthetic effect in varieties of configurations not possible with standard fixed connectors. The adjustability allows for on-site modification of the installation if a different configuration is desired. The adjustability further allows for minor adjustments to compensate for tolerances and restrictions in installation. For example, if an installation is slightly off the desired configuration, an adjustment can be made to correct for the deviation at the connection between two light fixtures, rather than the deviation being compounded by fixed connectors as more light fixtures are added. In another example, junction boxes for power or support structures are placed in walls or ceilings at locations in accordance with a desired design. However, it is not uncommon for the positions of such structures to be slightly off with respect to the light fixture assembly, such that support cables or power connections do not align properly with their connections points in the light fixture assembly. Since current fixed installations cannot be re-configured, the junction boxes or support structures must be removed and re-installed at the correct locations, which is a costly and time-consuming process. By using the adjustable connector, the angles of the light fixtures can be adjusted to match the placement of the junction boxes or support structures, rather than adjusting the placement of the junction boxes or support structures to match the configuration of the light fixtures, thereby saving time, money, and effort without substantially altering the desired configuration and aesthetic effect.

In accordance with at least one possible exemplary embodiment, the connector includes a projection or bumpout that projects into the housing of the lighting fixture. The bumpout seals or closes or blocks the seam or edge or gap where the end edges of the housing of the lighting fixture meet or abut against the housing or face of the connector. The bumpout protects against what are known as "light leaks," that is, light passing through the seam between the connector and the lighting fixture housing, which is aesthetically undesirable.

In accordance with at least one possible exemplary embodiment, the light fixture includes a downlight support structure, or an uplight support structure, or both. If the uplight support structure is not included, a cap can be included to close the top of the housing of the lighting fixture. In accordance with at least one possible exemplary embodiment, the downlight support structure, the uplight support structure, and/or the cap are designed to be connected to the housing by a snap-fit connection which permits attachment and removal in a direction substantially transverse or perpendicular to the length or longitudinal dimension of the light fixture housing. The housing is designed in a corresponding manner to permit the snap-fit connection.

DETAILED DESCRIPTION

Figures 1, 1A, 2, 2A, 3, 3A, 4, 4A, 5, 5A, 6, 6A, 7, 7A, 8, 8A:
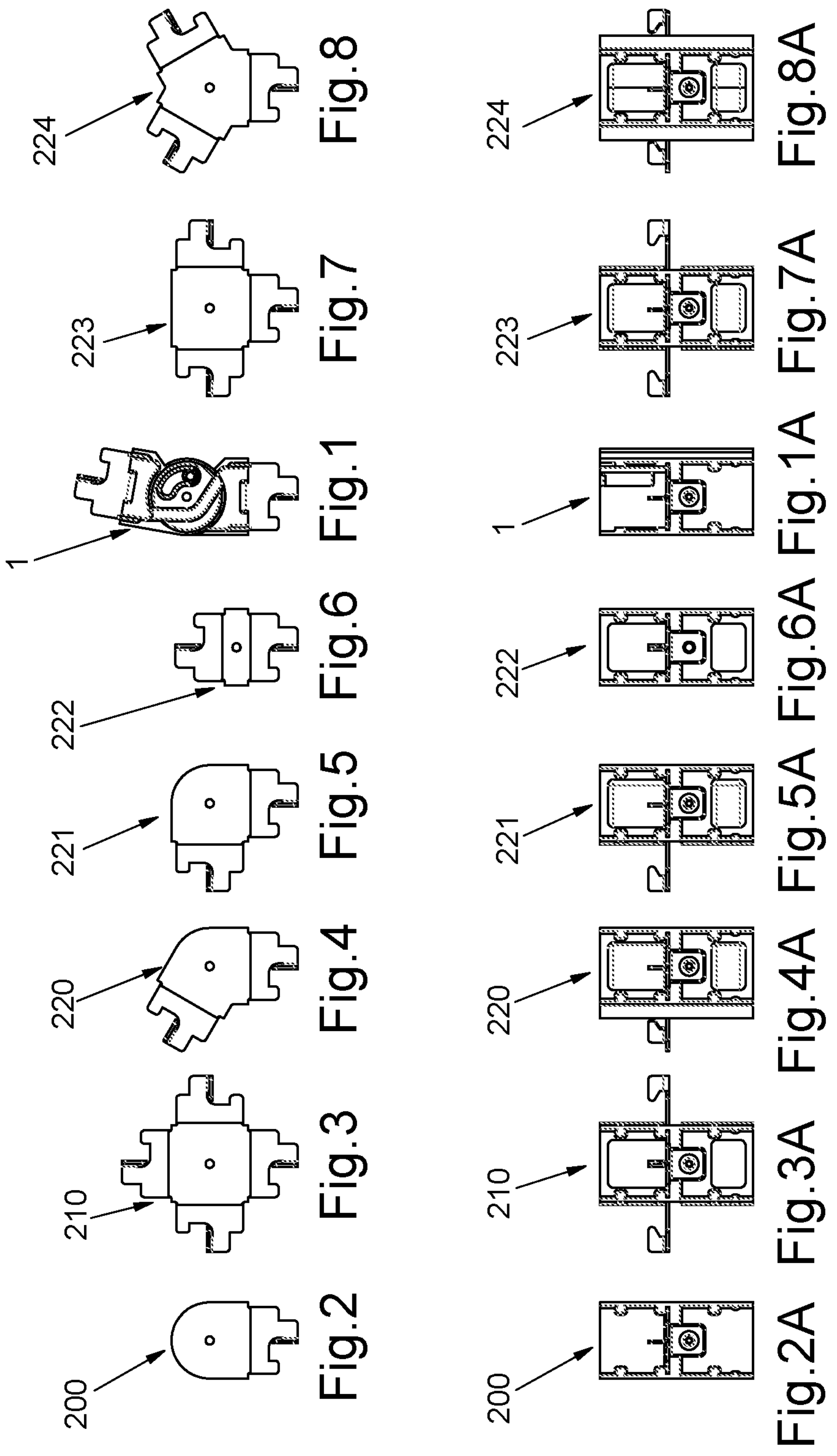
FIGS. 1-8A show different types of light fixture connectors, including fixed connectors and one adjustable connector, in accordance with at least one possible exemplary embodiment.

FIGS. 1-8A show different types of light fixture connectors, including fixed connectors 200, 210, 220, 221, 222, 223, and 224 and one adjustable connector 1, in accordance with at least one possible exemplary embodiment. The fixed connectors 200, 210, 220, 221, 222, 223, and 224 are "fixed" in the sense that the structures that connect to an elongated light fixture have one orientation or design that cannot be adjusted or modified after manufacture. The adjustable connector 1 is "adjustable" in the sense that it comprises two main portions or components that are pivotable or movable or rotatable with respect to one another to achieve any number of orientations or designs within the range or angular range of pivot or rotation to permit adjustment after manufacture. FIG. 1 shows the adjustable connector 1 that is adjustable to permit orientation of two light fixtures at any angular relationship from 90 degrees to 170 degrees, which range includes all angular positions in whole degrees and tenths or hundredths of a degree. FIGS. 2 and 2A show a first fixed connector or connector cap or end cap 200 for closing one end of a light fixture. FIGS. 3 and 3A show a second fixed connector or cross-shaped connector 210 to connect four light fixtures and orient them at right angles or perpendicular to an adjacent one of the light fixtures. FIGS. 4 and 4A show a third fixed connector or first elbow connector 220 to connect two light fixtures and orient them at a 60-degree angle to one another. FIGS. 5 and 5A show a fourth fixed connector or second elbow connector 221 that orients the two light fixtures at a 90-degree angle. FIGS. 6 and 6A show a fifth fixed connector or straight connector 222 to connect two light fixtures in a straight line or at a 180-degree angle to one another. FIGS. 7 and 7A show a sixth fixed connector or T-shaped connector 223 to connect three light fixtures at 90-degree angles like the cross-shaped connector 210. FIGS. 8 and 8A show a seventh fixed connector or Y-shaped connector 224 to connect three light fixtures like the T-shaped connector 223, but at 60-degree angles. It should of course be understood that the angular orientations of the fixed connectors are merely exemplary and any number of angular arrangements of the light fixtures could be achieved as desired in the manufacturing process. Each of the connectors includes one or more connecting structures or tab structures to permit connection to one or more light fixtures in accordance with the design of the respective connector.

Figure 9:
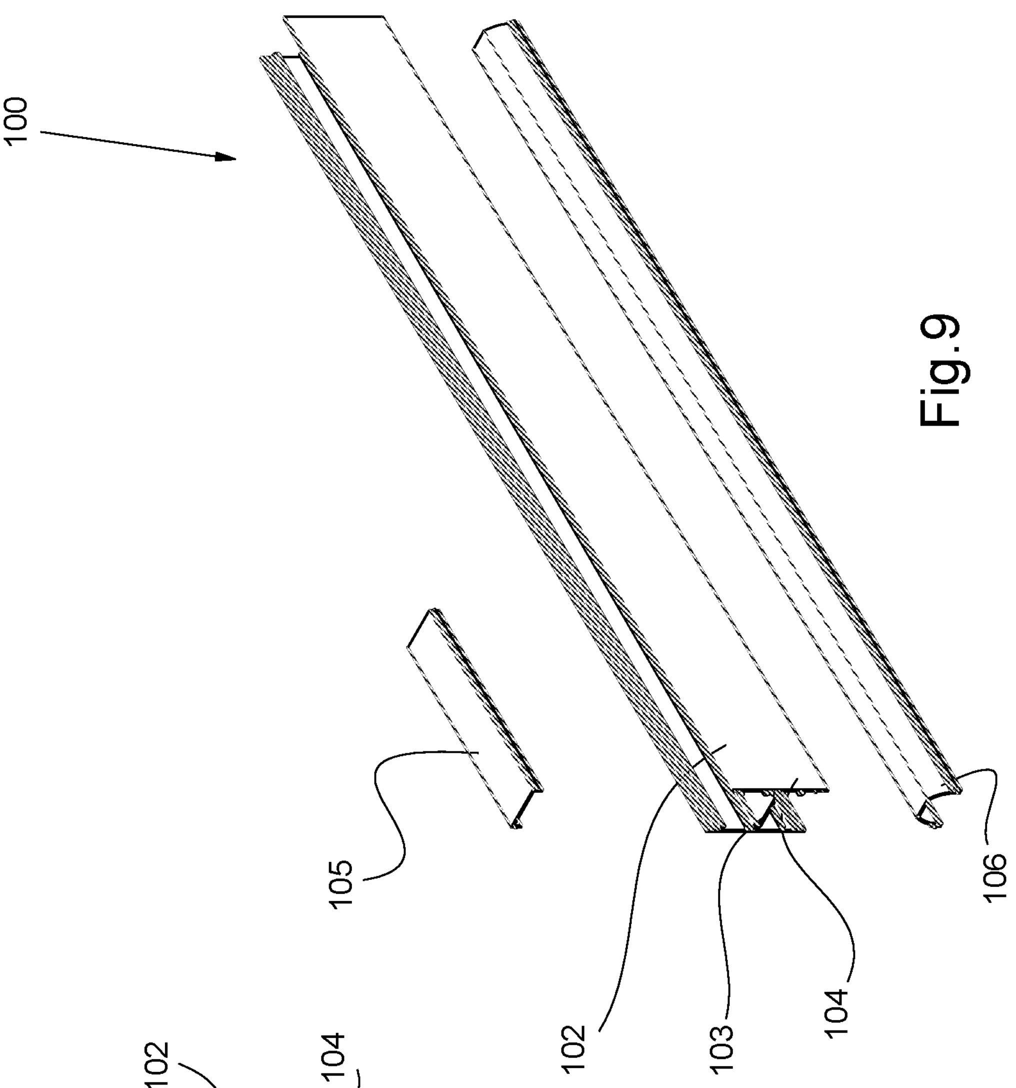
FIG. 9 shows a first light fixture, in accordance with at least one possible exemplary embodiment.
Figure 10:
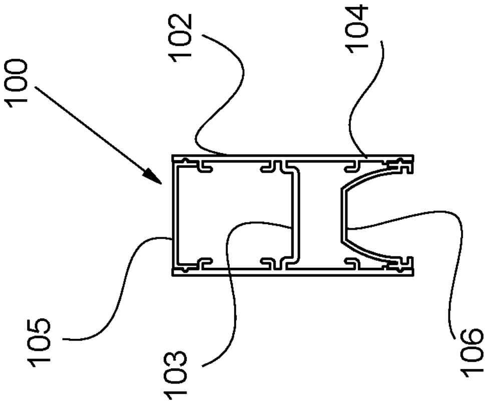
FIG. 10 shows an end view of the first light fixture.

FIG. 9 shows a first light fixture 100, in accordance with at least one possible exemplary embodiment. The light fixture 100 generally has an H-shaped cross-sectional design comprising two essentially parallel sides connected by a cross piece 103. The light fixture 100 comprises an upper portion 102 and a lower portion 104. The light fixture 100 includes a downlight structure 106 on its lower portion 104 to be oriented to face the floor of a room and a cap structure 105 on its upper portion 102 to be oriented to face the ceiling of the room. FIG. 10 shows an end view of the first light fixture 100.

Figure 11:
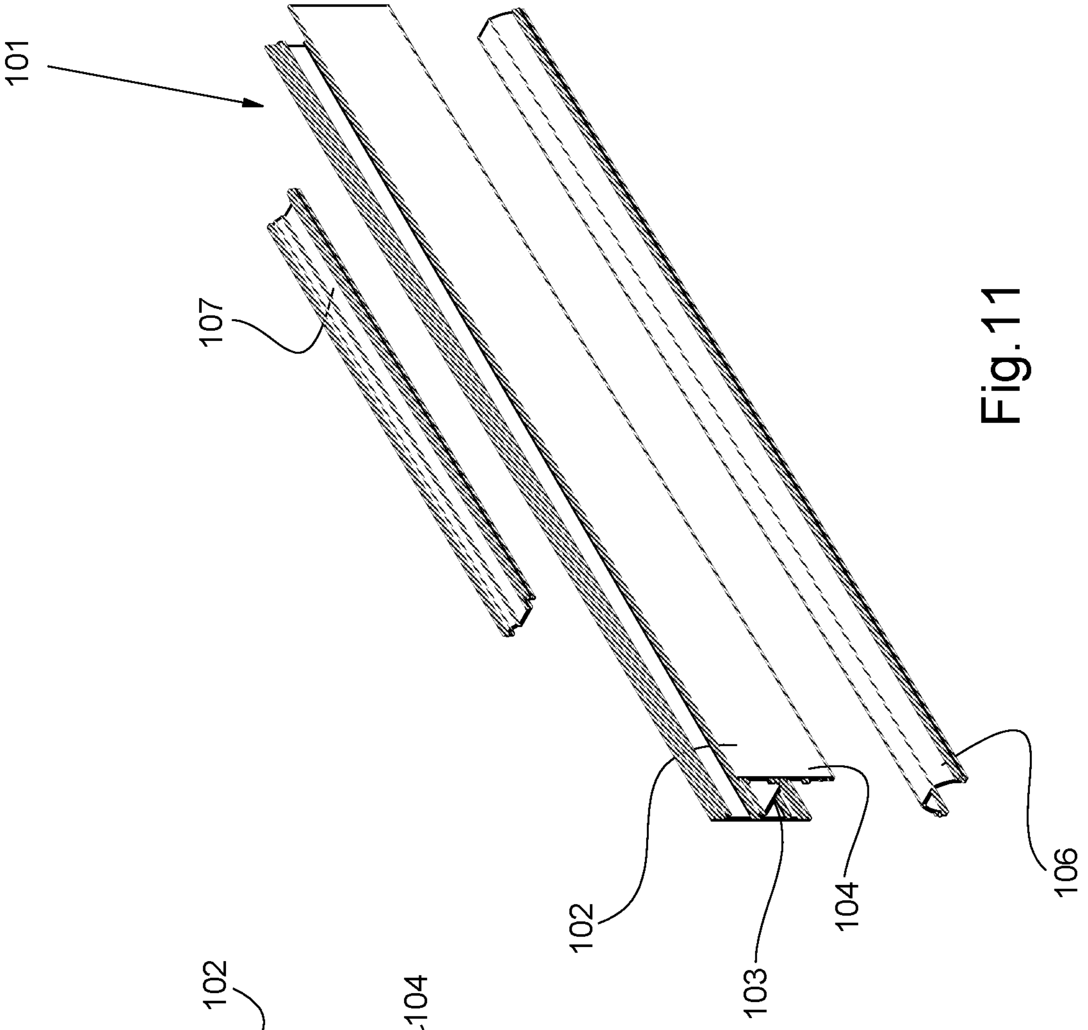
FIG. 11 shows a second light fixture, in accordance with at least one possible exemplary embodiment.
Figure 12:
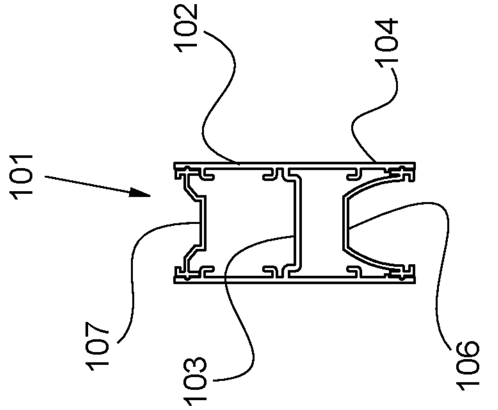
FIG. 12 shows an end view of the second light fixture.

FIG. 11 shows a second light fixture 101, in accordance with at least one possible exemplary embodiment. The second light fixture 101 is identical to the first light fixture 100, with the only difference being that the second light fixture 101 comprises an uplight structure 107 instead of a cap structure 105. In at least one possible exemplary embodiment, the first and second light fixtures 100, 101 could each comprise both the uplight structure 107 and the cap structure 105, installed on sections of the first and second light fixtures 100, 101, to accomplish a desired lighting effect in a room or building. FIG. 12 shows an end view of the second light fixture 101.

Figure 14A:
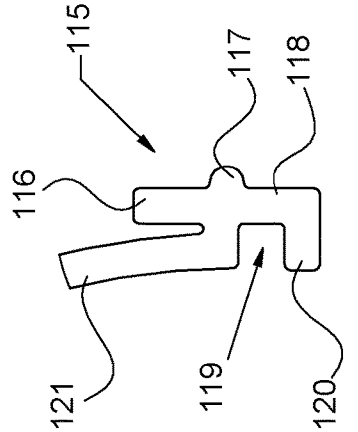
FIG. 14A shows a close up view of a portion of the downlight structure circled in FIG. 14.
Figure 13:
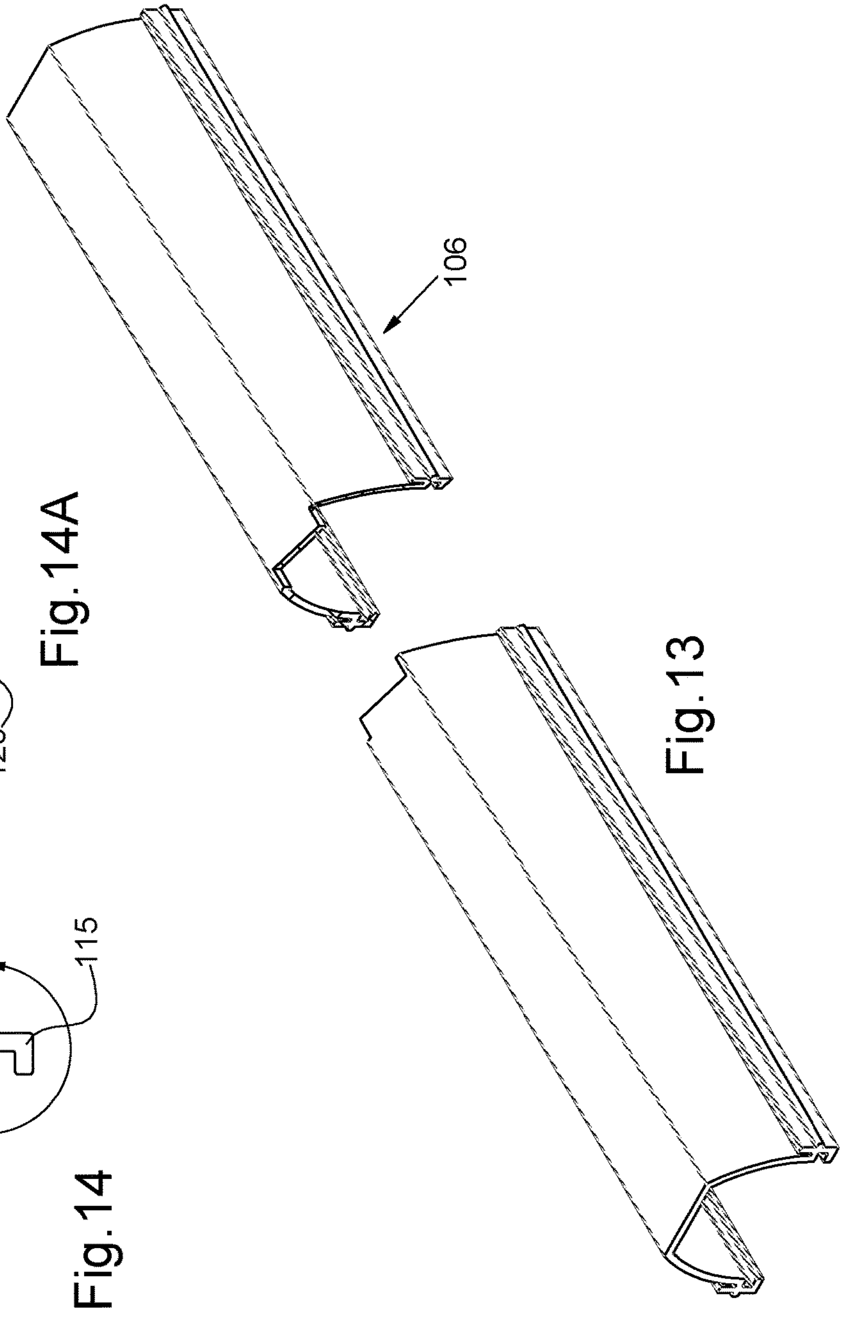
FIG. 13 shows a downlight structure, in accordance with at least one possible exemplary embodiment.
Figure 14:
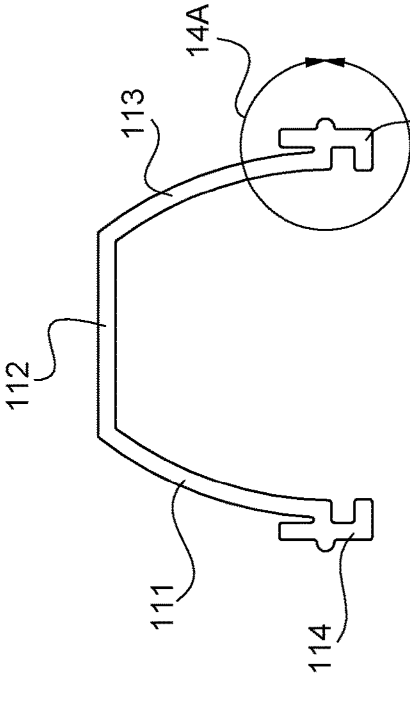
FIG. 14 shows an end view of the downlight structure.
Figure 16:
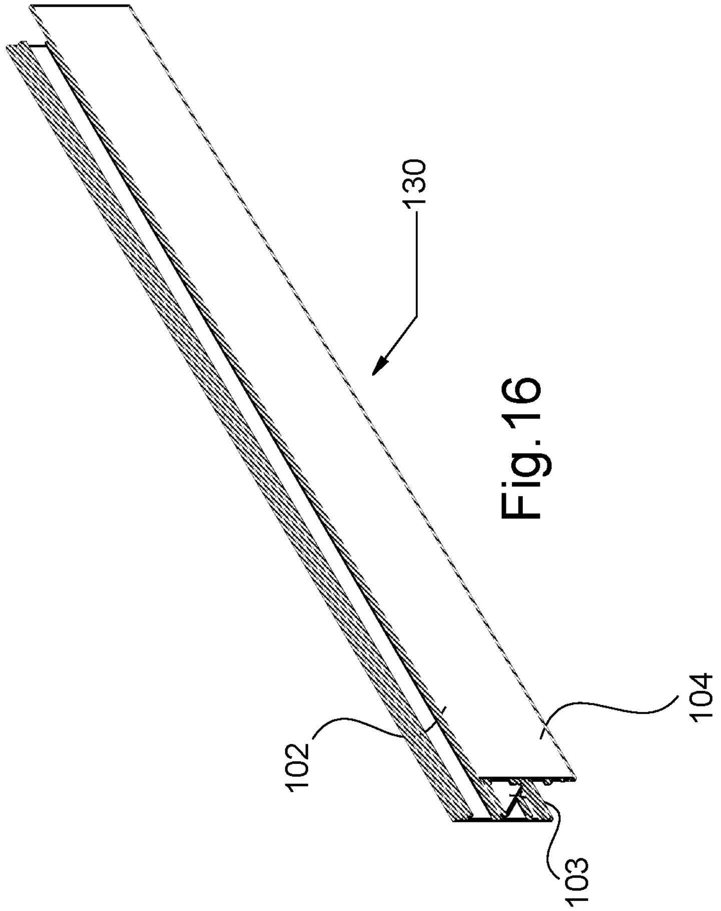
FIG. 16 shows a perspective view of the light fixture housing.

FIG. 13 shows a downlight structure 106, in accordance with at least one possible exemplary embodiment. FIG. 14 shows an end view of the downlight structure 106. The downlight structure 106 comprises a first curved leg 111 and a second curved leg 113, each connected by a connecting portion 112. At the end of the first curved leg 111 is a first snap-fit connecting structure 114, and at the end of the second curved leg 113 is a second snap-fit connecting structure 115. FIG. 14A shows a close up view of a portion of the downlight structure 106 circled in FIG. 14, specifically the second snap-fit connecting structure 115. The snap-fit connecting structure 115 comprises a first contact portion 116, a locking projection 117, a second contact portion 118, a slot or recess 119, a support leg 120, and an end portion 121, which is part of the second curved leg 113. As discussed further below, the downlight structure 106 is designed to be installed into a light fixture housing 130, as shown in FIGS. 15 and 16.

Figure 15A:
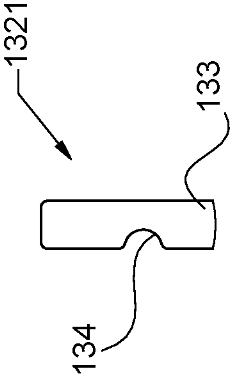
FIG. 15A shows a close up view of a portion of the light fixture housing circled in FIG. 15.
Figure 15:
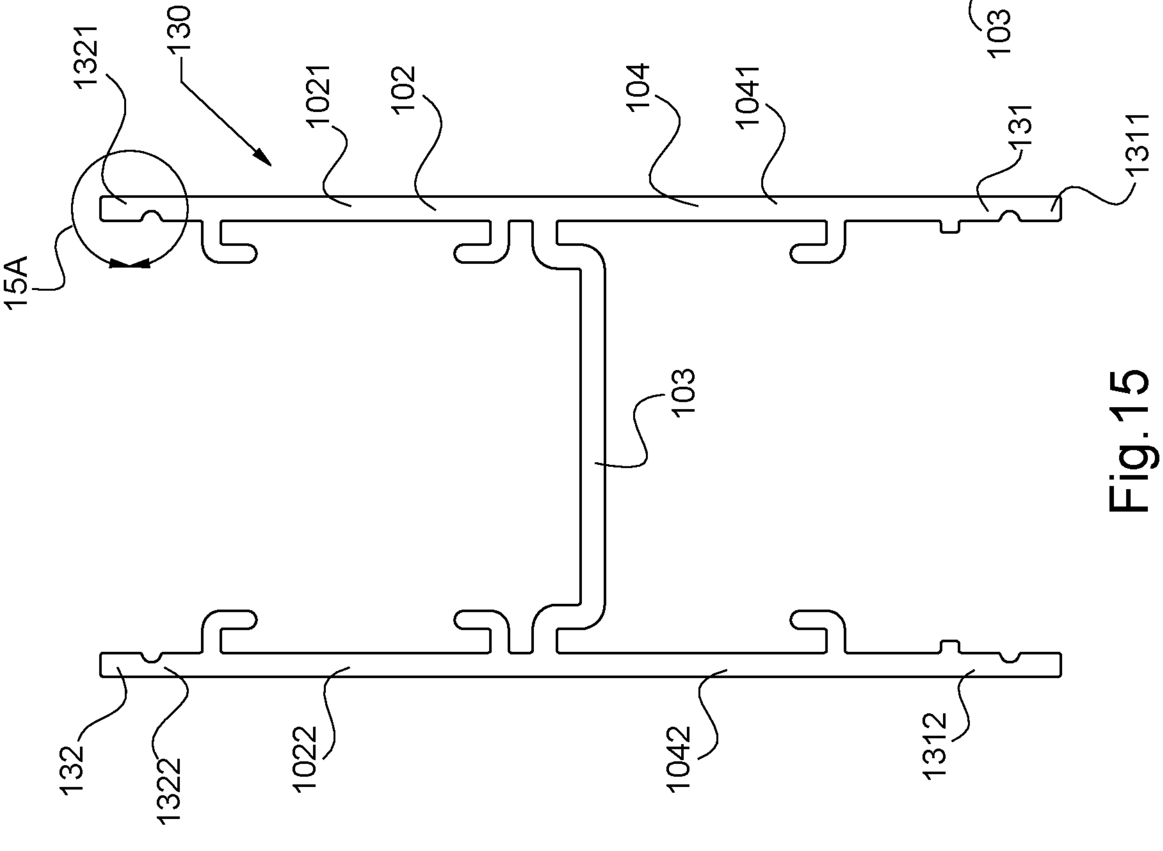
FIG. 15 shows an end view of a light fixture housing, in accordance with at least one possible exemplary embodiment.

FIG. 15 shows an end view of the light fixture housing 130 of either of the light fixtures 100, 101. FIG. 16 shows a perspective view of the light fixture housing 130. As seen in FIG. 15, the light fixture housing 130 comprises the upper portion 102, cross piece 103, and lower portion 104. The upper portion 102 comprises a first upper leg 1021 and a second upper leg 1022. The upper portion 102 further comprises a snap-fit arrangement 132 comprising a first snap-fit portion 1321 and a second snap-fit portion 1322, each connected to the first upper leg 1021 and the second upper leg 1022, respectively. Similarly, the lower portion 104 comprises a first lower leg 1041 and a second lower leg 1042. The lower portion 104 further comprises a snap-fit arrangement 131 comprising a first snap-fit portion 1311 and a second snap-fit portion 1312, each connected to the first lower leg 1041 and the second lower leg 1042, respectively. FIG. 15A shows a close up view of a portion of the light fixture housing 130 circled in FIG. 15, specifically the first snap-fit portion 1321. The first snap-fit portion 1321 comprises an end portion 133 and a recess 134. In accordance with at least one possible exemplary embodiment, the design of each of the snap-fit portions 1311, 1312, 1321, and 1322 can be identical, so the description and design of the first snap-fit portion 1321 according to FIG. 15A is applicable to each of the other snap-fit portions 1311, 1312, and 1322.

Figure 17:
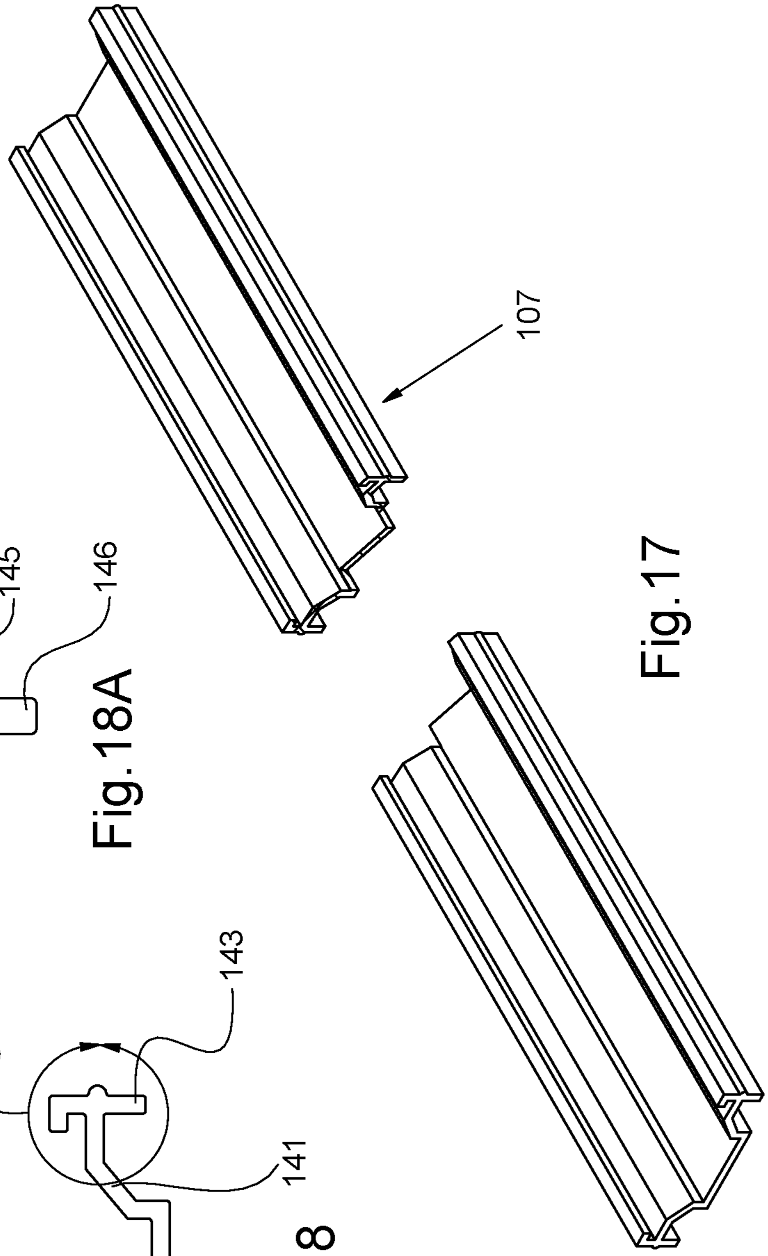
FIG. 17 shows an uplight structure, in accordance with at least one possible exemplary embodiment.
Figure 18A:
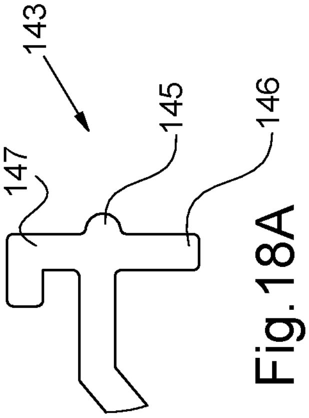
FIG. 18A shows a close up view of a portion of the uplight structure circled in FIG. 18.
Figure 18:
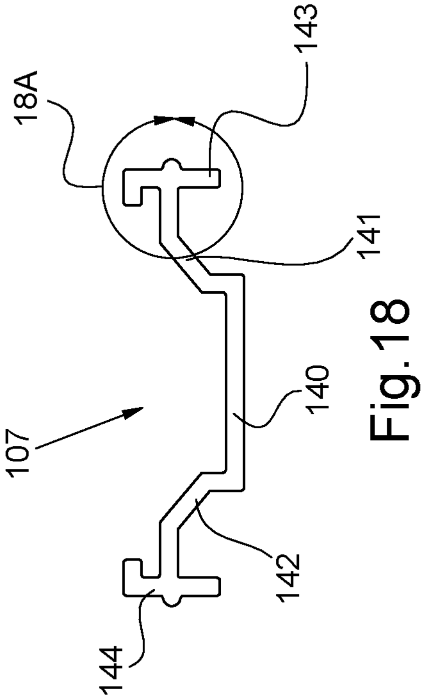
FIG. 18 shows an end view of the uplight structure.

FIG. 17 shows the uplight structure 107, in accordance with at least one possible exemplary embodiment. FIG. 18 shows an end view of the uplight structure 107. The uplight structure 107 comprises a first leg 141 and a second leg 142, each connected by a connecting portion 140. At the end of the first leg 141 is a first snap-fit connecting structure 143, and at the end of the second leg 142 is a second snap-fit connecting structure 144. FIG. 18A shows a close up view of a portion of the uplight structure 107 circled in FIG. 18, specifically the first snap-fit connecting structure 143. The first snap-fit connecting structure 143 comprises a first contact portion 146, a locking projection 145, and a second contact portion 147. The uplight structure 107 is designed to be installed into the light fixture housing 130, as shown in FIGS. 11 and 12.

The uplight structure 107 has a snap-fit connection that cooperates with a corresponding portion of the light fixture housing 130 to connect the two. The snap-fit connection can permit installation of the uplight structure 107 in the light fixture housing 130 by pressing the uplight structure 107 into the light fixture housing 130 without using tools. To further explain, the uplight structure 107 can be inserted by facing the connecting portion 140 toward or substantially parallel to the cross piece 103 of the light fixture housing 130, then pressing the uplight structure 107 into the light fixture housing 130 such that the connecting portion 140 is moved toward the cross piece 103. With reference to FIGS. 15A and 18A, the uplight structure 107 is moved into the upper portion 102 until the locking projection 145 is moved into contact with or abuts the edge of the end portion 133, as the outside diameter or width of the uplight structure 107 at the locking projection 145 is greater than the inside diameter of the snap-fit arrangement 132. The uplight structure 107 is made of a flexible metal or plastic material, so the first leg 141 can be temporarily flexed or bent inwardly, such that the locking projection 145 can be moved past the end portion 133 and into the corresponding recess 134 to form a snap-fit connection between the first snap-fit portion 1321 and the first snap-fit connecting structure 143. At this point, the first contact portion 146 and the second contact portion 147 are in contact against the interior surface of the end portion 133. The second snap-fit connecting structure 144 can be inserted into engagement with the second snap-fit portion 1322 in a similar manner, either essentially simultaneously to the first snap-fit connecting structure 143 or in steps with one being inserted before the other. The uplight structure 107 can also be removed from the light fixture housing 130 by dislodging the snap-fit connection in a reversal of the insertion process.

With reference to FIGS. 13-16, the downlight structure 106 also can be installed via a snap-fit connection in a similar manner as the uplight structure 107, but into the lower portion 104 of the light fixture housing 130. The snap-fit connection can permit installation of the downlight structure 106 in the light fixture housing 130 by pressing the downlight structure 106 into the light fixture housing 130 without using tools. To further explain, the downlight structure 106 can be inserted by facing the connecting portion 112 toward or substantially parallel to the cross piece 103 of the light fixture housing 130, then pressing the downlight structure 106 into the light fixture housing 130 such that the connecting portion 112 is moved toward the cross piece 103. With reference to FIGS. 14A and 15, the downlight structure 106 is moved into the lower portion 104 until the locking projection 117 is moved into contact with or abuts the edge of the first snap-fit portion 1311, as the outside diameter or width of the downlight structure 106 at the locking projection 117 is greater than the inside diameter of the snap-fit arrangement 131. The downlight structure 106 is made of a flexible metal or plastic material, so the second curved leg 113 can be temporarily flexed or bent inwardly, such that the locking projection 117 can be moved past the first snap-fit portion 1311 and into a corresponding recess to form a snap-fit connection between the second snap-fit connecting structure 115 and the first snap-fit portion 1311. At this point, the first contact portion 116 and the second contact portion 118 are in pressing contact against the interior surface of the first snap-fit portion 1311. The first snap-fit connecting structure 114 can be inserted into engagement with the second snap-fit portion 1312 in a similar manner, either essentially simultaneously to the second snap-fit connecting structure 115 or in steps with one being inserted before the other. The downlight structure 106 can also be removed from the light fixture housing 130 by dislodging the snap-fit connection. In the downlight structure of FIG. 4, for example, a lighting element, such as an LED light or LED tape, will be located on the lower surface of the downlight structure facing the floor of a room.

The snap-fit connection, for any of the cap structure 105, downlight structure 106, and uplight structure 107, permits the installation and removal of these structures without having to disassemble portions of the first light fixture 100 or the second light fixture 101. To further explain, light fixtures of similar design allow installation and removal of such structures in a direction parallel to or along the longitudinal axis of the light fixture, that is, the structures are slid into slots from an open end of the light fixture. This is accomplished by removing an end cap or similar structure from the end of the light fixture to permit access to the interior of the light fixture. The elongated structure, such as an uplight or downlight, is then slid into the interior of the light fixture in retaining guide slots. Such a design is not an issue during the initial assembly or installation of the light fixture, but does present a problem during replacement of the uplight or downlight structure. To further explain, if the uplight or downlight becomes damaged or is defective or simply ceases to function due to age and wear, then that lighting structure needs to be removed and replaced. To do so, the end cap or closing structure at the end of the light fixture will need to be removed in order to permit access to the interior of the light fixture to slide out the old lighting structure. While such a process is not terribly complicated in itself, accessing the end cap and/or having enough space to slide out the elongated lighting structure can be quite difficult, depending on the configuration, design, and/or placement of the light fixture, especially if it is one light fixture of several that form an overall lighting assembly, as is often the case. In such a situation, the entire light fixture, for example, may need to be removed or disassembled or disconnected from other light fixtures to permit replacement of the lighting structure, followed by re-assembly and re-installation. This can be a very challenging job for any average building occupant or maintenance staff, especially for complex lighting assemblies or designs, and could even require professional assistance from a lighting specialist. In accordance with at least one possible exemplary embodiment, the snap-fit design of the first light fixture 100 or second light fixture 101 can solve this problem by permitting installation and removal in a direction substantially transverse or perpendicular to the length or longitudinal dimension of the light fixture housing, i.e., away from the cross piece 103. Installation, as discussed above, can be accomplished by simply pressing the uplight structure 107 or downlight structure 106 into the light fixture housing. The snap-fit design of the uplight structure 107 or downlight structure 106 permits such an installation, which can be performed by hand without tools. Removing end caps or disassembling portions of the light fixture, for example, is unnecessary. While such a design provides ease of installation, it also provides ease of removal, which results in a substantial advantage during replacement of the uplight structure 107 and/or downlight structure 106. In at least one possible exemplary embodiment, openings, such as slots or holes, can be located in the cross piece 103. An opening 65 is shown in the exemplary embodiment in FIG. 34. These openings permit a person to press against the back or rear surface of the uplight structure 107 and/or downlight structure 106, either using a tool, such as a screwdriver or similar elongated tool, or the person's fingers. In this manner, the uplight structure 107 and/or downlight structure 106 can be dislodged or popped out of the respective upper portion 102 and/or lower portion 104 without the need to disassemble and/or remove the light fixture. This can be very advantageous in an installation of light fixtures that are positioned and/or arranged in a desired pattern or arrangement or positioning. Once the light fixtures have been installed, especially to produce a desired aesthetic in a room or building, it is undesirable to move or manipulate the light fixtures in order to replace light structures, as such may be difficult and could result in the light fixtures no longer producing the desired aesthetic. The ability to install and remove the uplight structure 107 and/or downlight structure 106, in accordance with at least one possible exemplary embodiment disclosed herein, overcomes this problem.

In accordance with at least one possible exemplary embodiment, light can be produced along a portion or the entirety of the length of a light fixture, such as the first light fixture 100 or the second light fixture 101, by using light-emitting diode (LED) lighting or other lighting structures or material. In some designs, the lighting can be provided by LED tape, which is a flexible strip of LED lights attached to a surface of the light fixture that faces toward the interior of a room. For example, in accordance with at least one possible exemplary embodiment, a lighting element, such as an LED light or LED tape, is located on the outer or upper surface of the connecting portion 140 of the uplight structure 107 to face the interior of a room and project light toward the ceiling. In accordance with at least one other possible exemplary embodiment, a lighting element, such as an LED light or LED tape, is located on the outer or lower surface of the connecting portion 112 of the downlight structure 106 to face the interior of a room and project light toward the floor.

Figure 19:
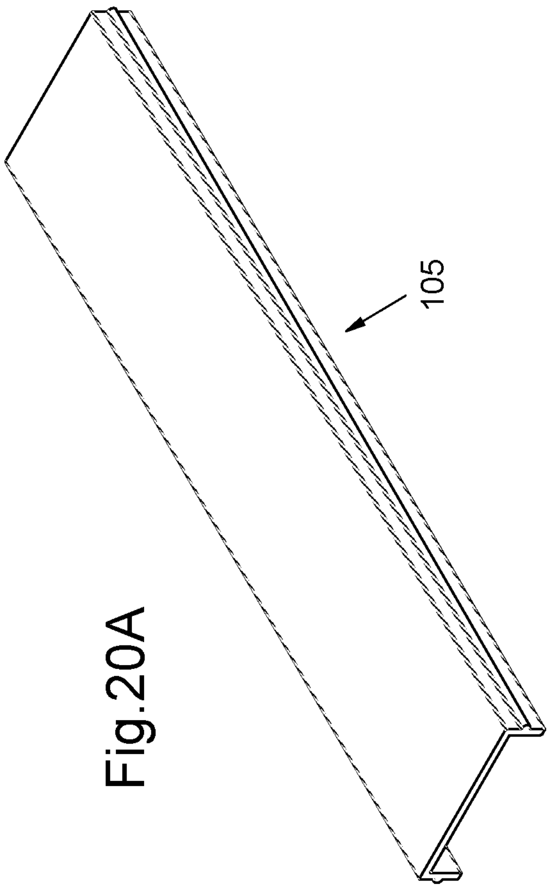
FIG. 19 shows a cap structure, in accordance with at least one possible exemplary embodiment.
Figure 20A:
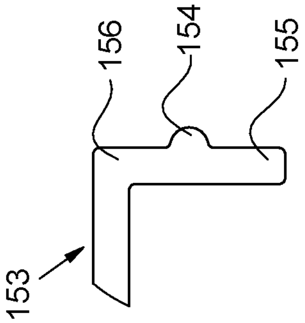
FIG. 20A shows a close up view of a portion of the cap structure circled in FIG. 20.
Figure 20:
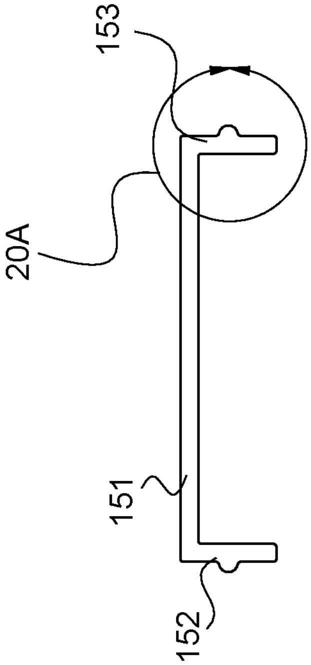
FIG. 20 shows an end view of the cap structure.

FIG. 19 shows the cap structure 105, in accordance with at least one possible exemplary embodiment. FIG. 20 shows an end view of the cap structure 105. The cap structure 105 comprises a first snap-fit connecting structure 152 and a second snap-fit connecting structure 153, each connected to one another by a connecting portion 151. FIG. 20A shows a close up view of a portion of the cap structure 105 circled in FIG. 20. Specifically, FIG. 20A shows the second snap-fit connecting structure 153, which comprises a locking projection 154, a first contact portion 155, and a second contact portion 156. The cap structure 105 is essentially an alternative to the uplight structure 107, wherein the cap structure 105 also covers or closes the upper portion 102 of the light fixture housing 130 but does not include any lighting element. Like the uplight structure 107, the cap structure 105 is made of a flexible material to allow for installation of the cap structure 105 into the light fixture housing 130 without tools. The cap structure 105 is likewise secured via a snap-fit connection in a similar manner as the uplight structure 107. It should be understood that any combination of the cap structure 105, downlight structure 106, and uplight structure 107 can be used in a lighting installation or fixture to produce a desired lighting effect. It should further be understood that the description of any snap-fit connection or connecting structures is applicable to all snap-fit connections or connecting structures shown in the figures or described herein, in accordance with at least one possible exemplary embodiment.

Figures 21, 21A, 21B, 21C, 21D, 21E, 21F, 21G, 21H:
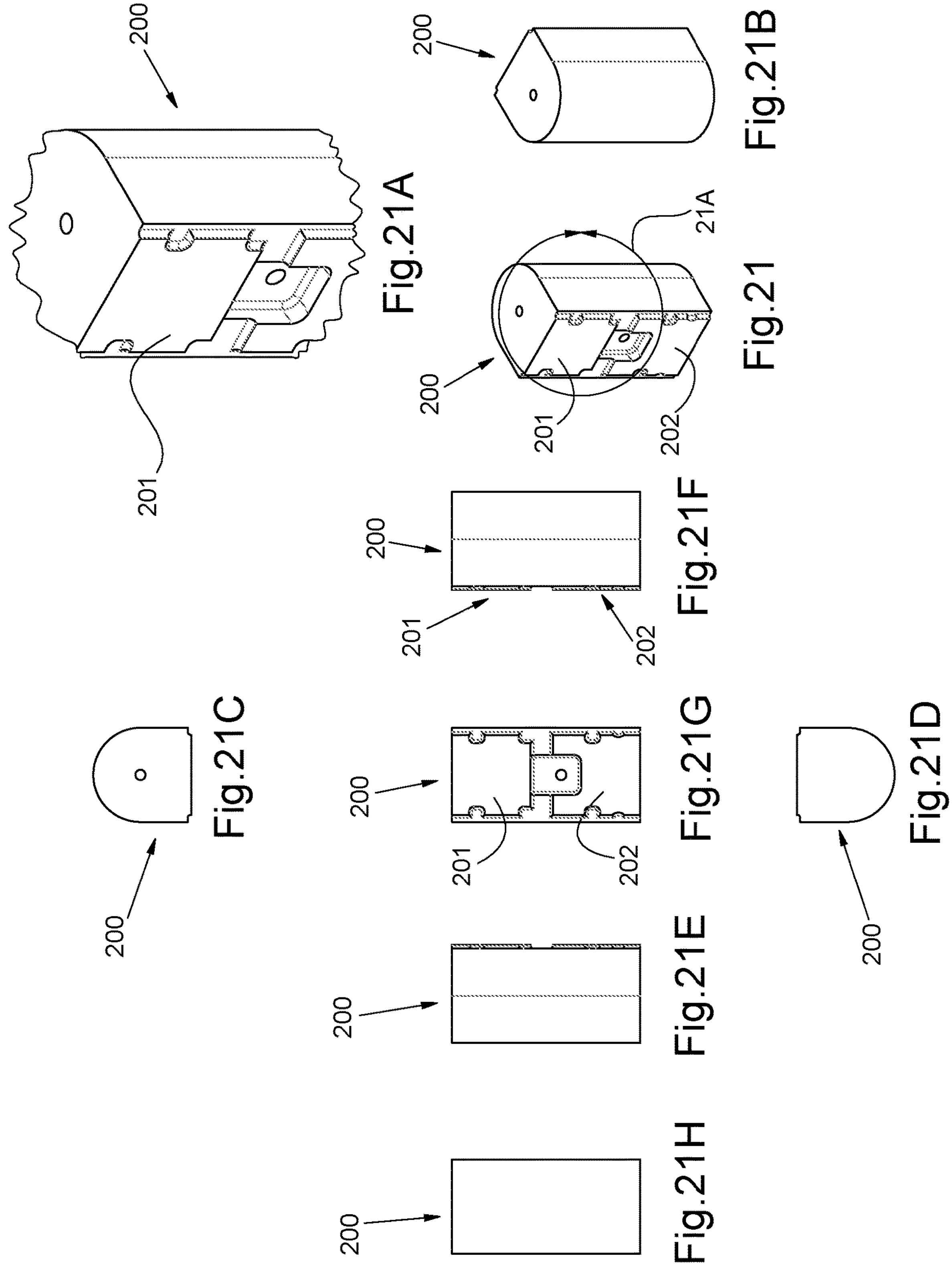
FIG. 21 shows a front perspective view of the connector cap or end cap without the connector bracket.
FIG. 21A shows a close up view of a portion of the connector cap or end cap circled in FIG. 21.
FIGS. 21B-21H show back perspective, top, bottom, right, left, front, and back views, respectively, of the connector cap or end cap.
Figure 29:
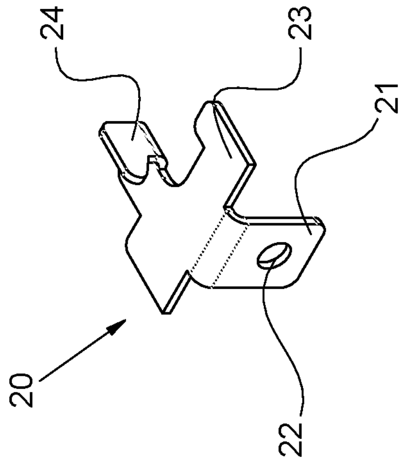
FIG. 29 shows a front perspective view of the connector bracket.

FIG. 21 shows a front perspective view of the connector cap or end cap 200 without a connector bracket 20 (see FIG. 29). FIG. 21A shows a close up view of a portion of the connector cap or end cap 200 circled in FIG. 21. FIGS. 21B-21H show back perspective, top, bottom, right, left, front, and back views, respectively, of the connector cap or end cap 200. The connector cap 200 is designed to cover one end of a light fixture housing 130. The connector cap 200 comprises a bumpout arrangement, which comprises a first projection or bumpout 201 and a second projection or bumpout 202. The first and second bumpouts 201, 202 are designed, upon installation of the connector cap 200 onto a light fixture housing 130, to project into the light fixture housing 130 to essentially seal or substantially seal the connection between the light fixture housing 130 and the connector cap 200 to prevent or minimize light leaks, that is, the passage of light from the lighting elements through the area or seam where the edges of the light fixture housing 130 meet or abut the face or edges of the connector cap 200. In current cap or cover structures that simply abut the end of a housing, it is not uncommon for light to escape between the abutting edges of the two structures, which is aesthetically and practically undesirable. The first and second bumpouts 201, 202 provide a more complete or complete blocking or sealing effect to minimize or prevent such light leakage by not only abutting the end of the light fixture housing 130, but also contacting the interior surfaces of the light fixture housing 130.

Figure 22:
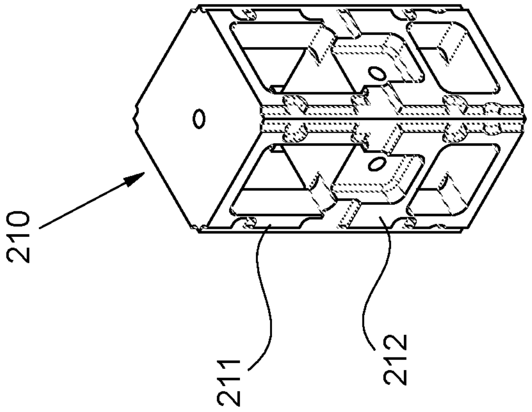
FIG. 22 shows a front perspective view of the cross-shaped connector without the connector brackets.
Figure 22B:
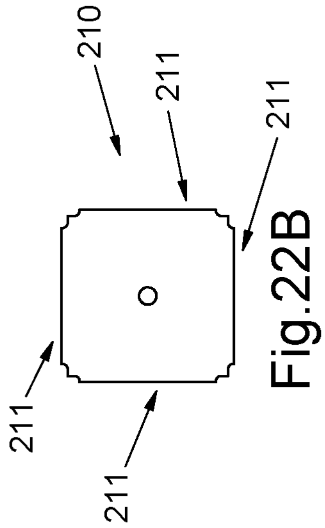
FIGS. 22A-22C show front, top, and bottom views, respectively, of the cross-shaped connector.
Figure 22A:
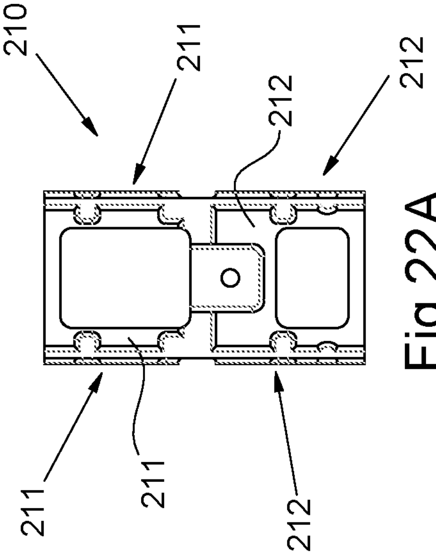
Figure 22C:
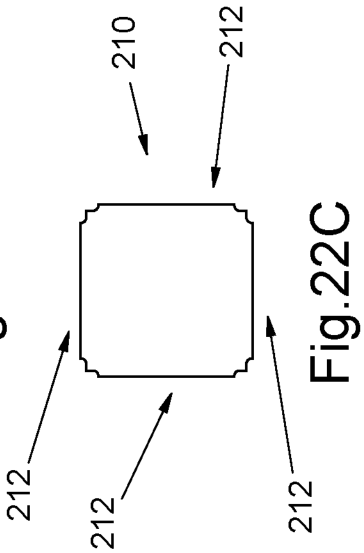

FIG. 22 shows a front perspective view of the cross-shaped connector 210 without the connector brackets 20. The cross-shaped connector 210 is designed to connect a maximum of four light fixture housings 130 at 90-degree angles with respect to adjacent light fixture housings 130. Accordingly, the cross-shaped connector 210 includes four bumpout arrangements, each comprising a first projection or bumpout 211 and a second projection or bumpout 212. FIGS. 22A-22C show front, top, and bottom views, respectively, of the cross-shaped connector 210.

Figure 23:
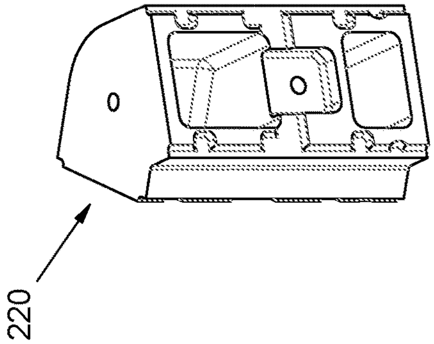
FIG. 23 shows a front perspective view of the first elbow connector without the connector brackets.
Figure 23A:
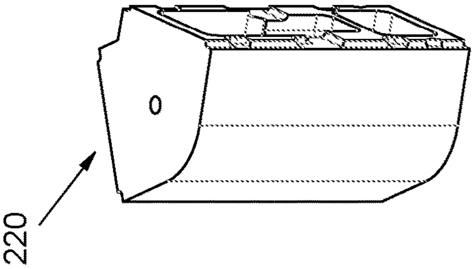
FIGS. 23A-23F show back perspective, top, bottom, front, left, and back views, respectively, of the first elbow connector.
Figure 23B:
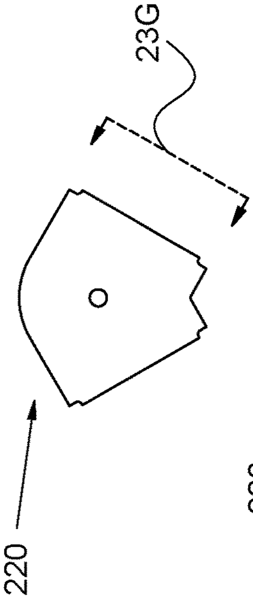
Figure 23G:
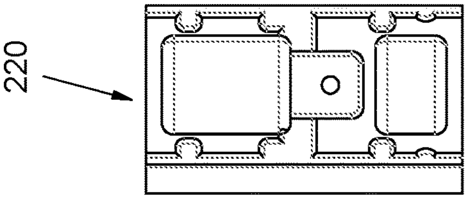
FIG. 23G shows a view facing one of the angled side faces of the first elbow connector as indicated in FIG. 23B.
Figure 23F:
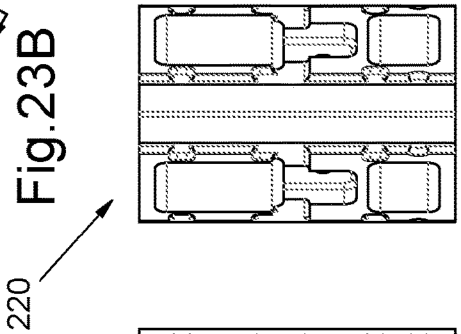
Figure 23C:
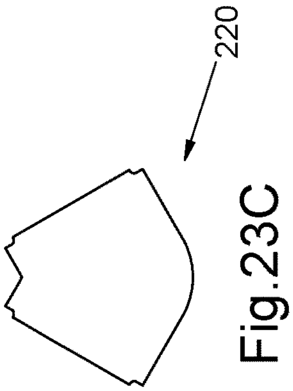
Figure 23E:
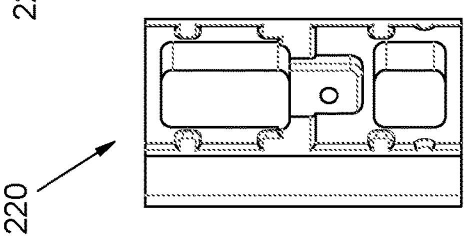
Figure 23D:
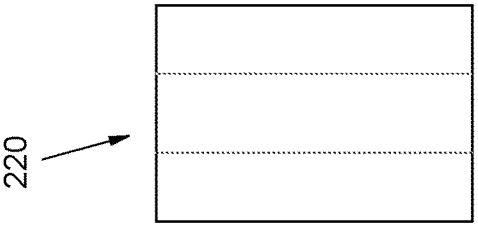

FIG. 23 shows a front perspective view of the first elbow connector 220 without the connector brackets 20, designed to connect two light fixture housings 130 at an angle less than 90 degrees. FIGS. 23A-23F show back perspective, top, bottom, front, left, and back views, respectively, of the first elbow connector 220. FIG. 23G shows a view facing one of the angled side faces of the first elbow connector 220 as indicated in FIG. 23B.

Figures 24, 24A, 24B, 24C, 24D, 24E, 24F, 24G:
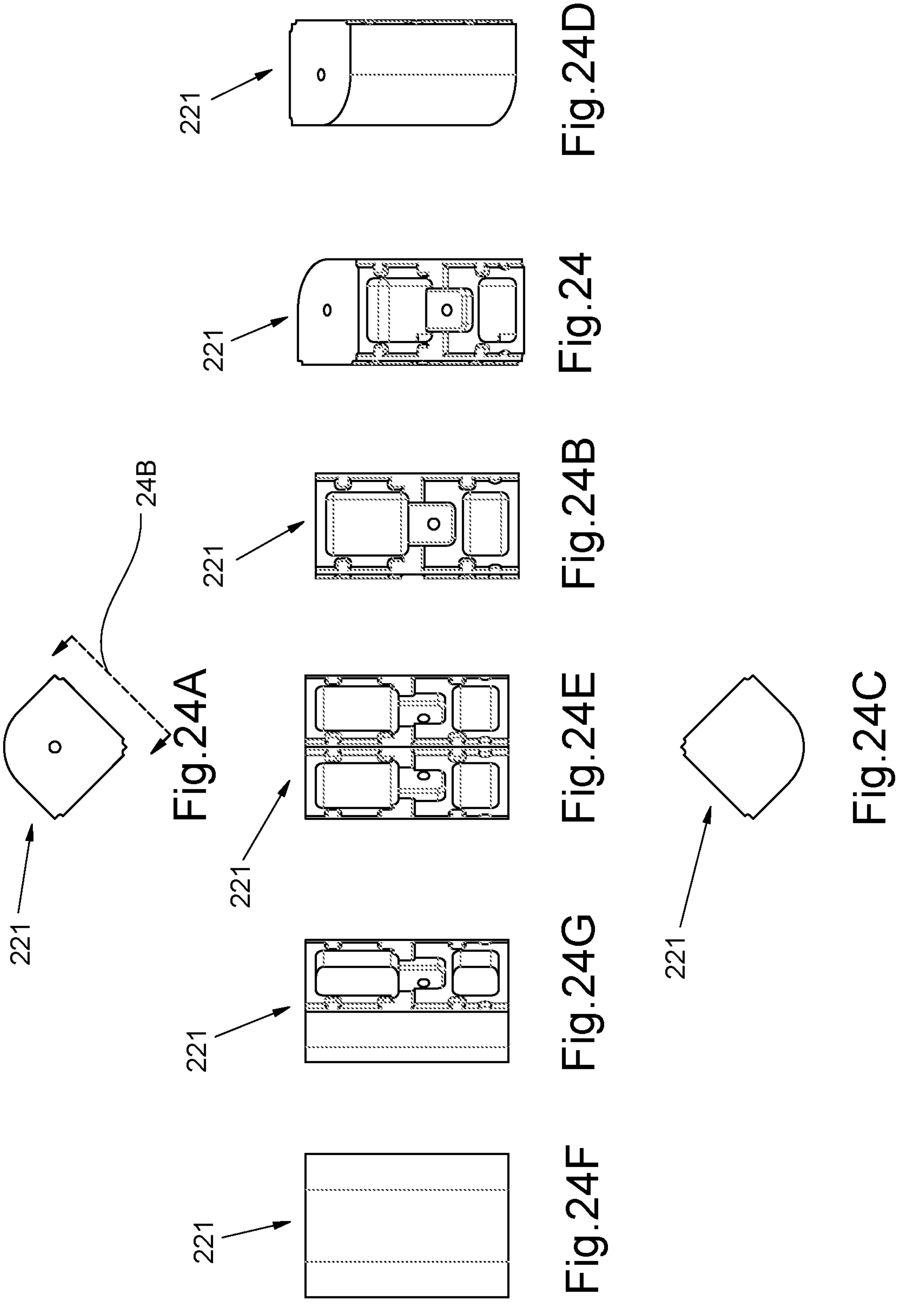
FIG. 24 shows a front perspective view of the second elbow connector without the connector brackets.
FIGS. 24A and 24C-24G show top, bottom, back perspective, front, back, and left views, respectively, of the second elbow connector.
FIG. 24B shows a view facing one of the angled side faces of the second elbow connector as indicated in FIG. 24A.

FIG. 24 shows a front perspective view of the second elbow connector 221 without the connector brackets 20, designed to connect two light fixture housings 130 at a 90-degree angle. FIGS. 24A and 24C-24G show top, bottom, back perspective, front, back, and left views, respectively, of the second elbow connector 221. FIG. 24B shows a view facing one of the angled side faces of the second elbow connector 221 as indicated in FIG. 24A.

Figure 25:
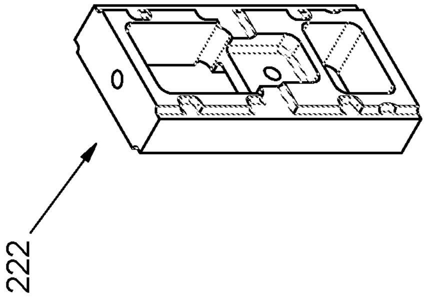
FIG. 25 shows a front perspective view of the straight connector without the connector brackets.
Figure 25B:
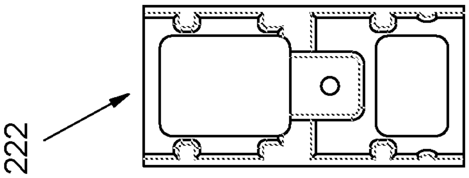
FIGS. 25A-25D show left, front, top, and bottom views, respectively, of the straight connector.
Figure 25C:
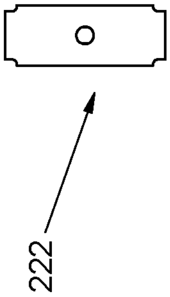
Figure 25A:
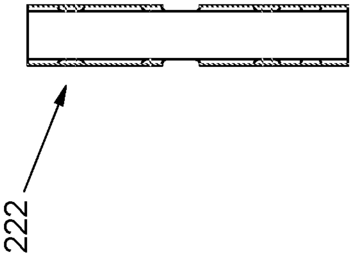
Figure 25D:
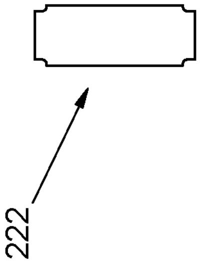

FIG. 25 shows a front perspective view of the straight connector 222 without the connector brackets 20, designed to connect two light fixture housings 130 in a straight line. FIGS. 25A-25D show left, front, top, and bottom views, respectively, of the straight connector 222.

Figure 26A:
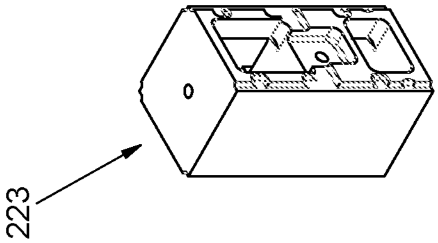
FIGS. 26A-26E show back perspective, back, front, top, and bottom views, respectively, of the T-shaped connector.
Figure 26:
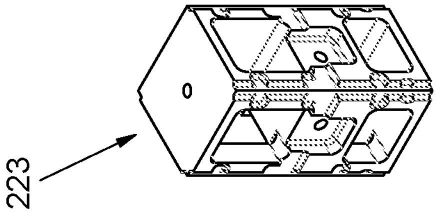
FIG. 26 shows a front perspective view of the T-shaped connector without the connector brackets.
Figure 26C:
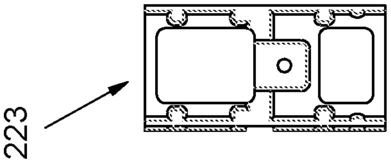
Figure 26D:
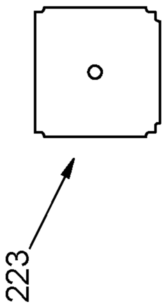
Figure 26B:
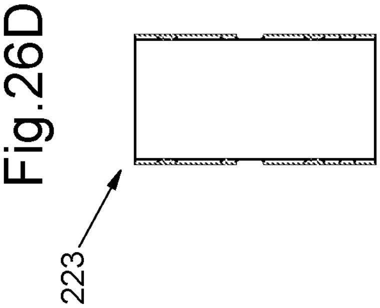
Figure 26E:
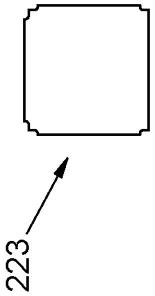

FIG. 26 shows a front perspective view of the T-shaped connector 223 without the connector brackets 20, designed to connect three light fixture housings 130 in a T-shaped layout. FIGS. 26A-26E show back perspective, back, front, top, and bottom views, respectively, of the T-shaped connector 223.

Figure 27:
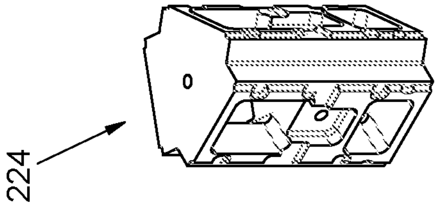
FIG. 27 shows a front perspective view of the Y-shaped connector without the connector brackets.
Figure 27B:
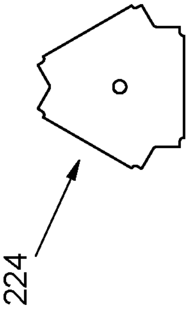
FIGS. 27A-27C show front, top, and bottom views, respectively, of the Y-shaped connector.
Figure 27A:
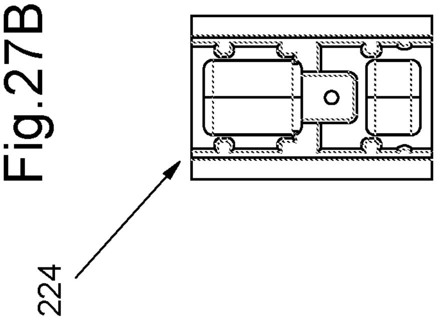
Figure 27C:
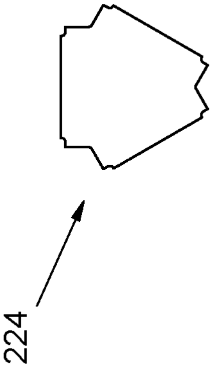

FIG. 27 shows a front perspective view of the Y-shaped connector 224 without the connector brackets 20, designed to connect three light fixture housings 130 in a Y-shaped layout. FIGS. 27A-27C show front, top, and bottom views, respectively, of the Y-shaped connector 224.

Figure 28:
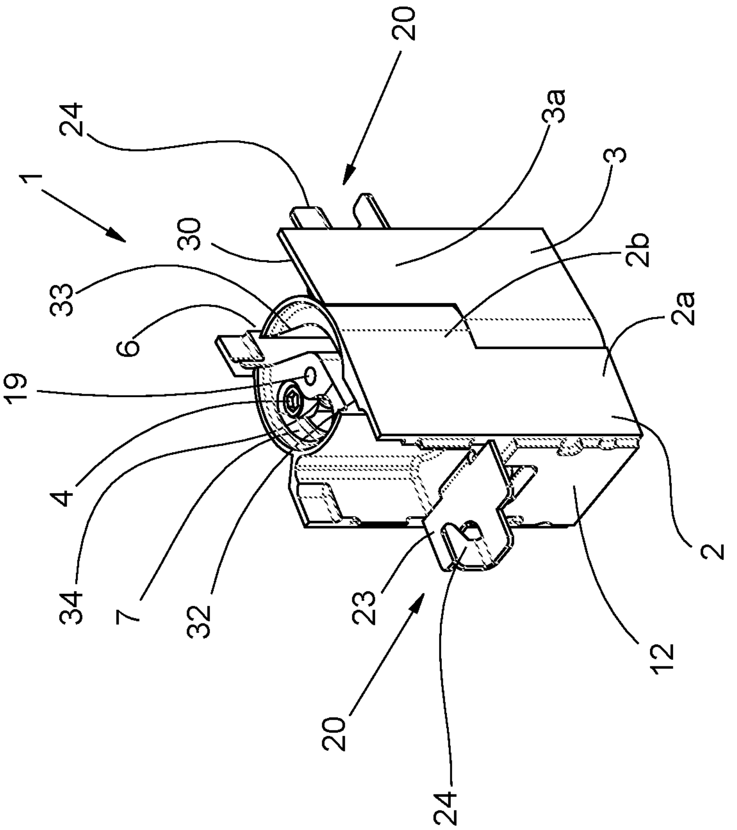
FIG. 28 shows a front perspective view of the adjustable connector.
Figure 28D:
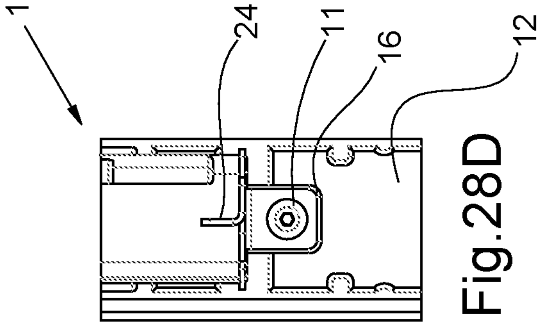
FIG. 28D shows a side view facing a first connector side of the adjustable connector according to FIGS. 28 and 28A.
Figure 28E:
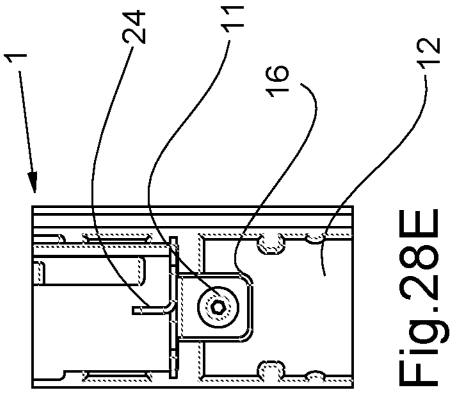
FIG. 28E shows a side view facing a second connector side of the adjustable connector according to FIGS. 28 and 28A.
Figure 28C:
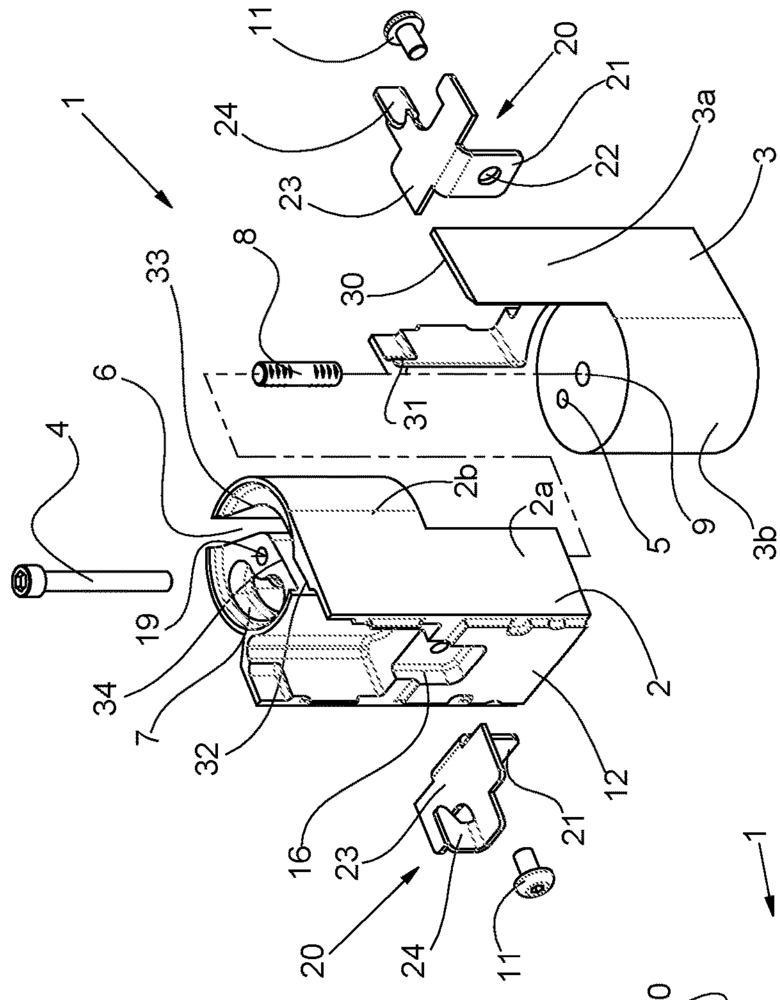
FIG. 28C shows an exploded view of the adjustable connector.
Figure 28A:
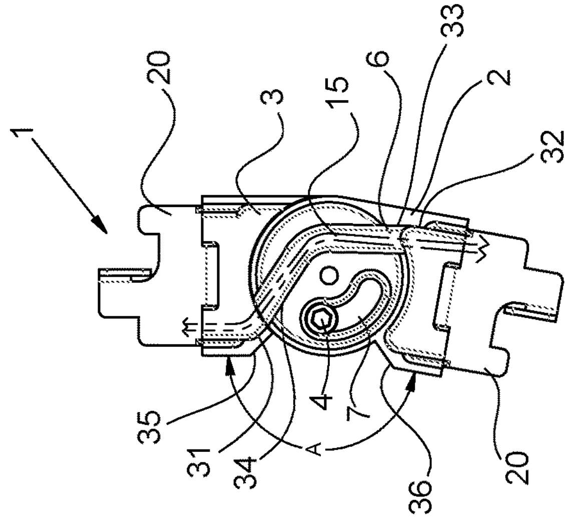
FIG. 28A shows a top view of the adjustable connector at a first angular position.
Figure 28B:
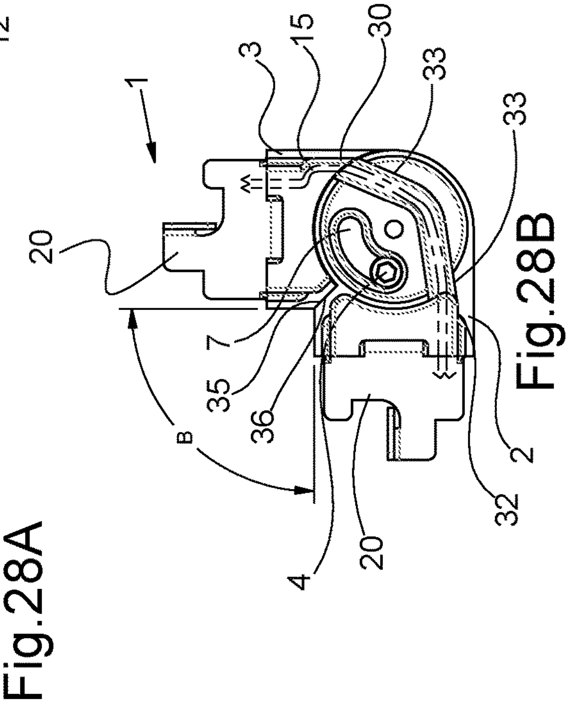
FIG. 28B shows a top view of the adjustable connector at a second angular position.

FIG. 28 shows a front perspective view of the adjustable connector 1, in accordance with at least one possible exemplary embodiment. FIG. 28C shows an exploded view of the adjustable connector 1. The adjustable connector 1, as best seen in FIG. 28C, is comprised of two parts or sections, namely a first body portion 2 and a second body portion 3. The first body portion 2 and the second body portion 3 are relatively adjustable or pivotable with respect to one another. The first body portion 2 comprises a rectangular section 2*a* and a first cylindrical section 2*b*, which have essentially or substantially rectangular and cylindrical shapes, respectively, though other shapes or configurations are possible in accordance with at least one possible exemplary embodiment. The second body portion 3 comprises a guide section 3*a* and a second cylindrical section 3*b*, which has an essentially or substantially cylindrical shape similar to the first cylindrical section 2*b*. Upon assembly, as seen in FIG. 28, the cylindrical portions 2*b*, 3*b* are aligned with one another and pivotably connected by an elongated connecting structure or pin or rod 8, which is shown in FIG. 28C and is inserted in first pivot opening 19 in the first cylindrical section 2*b* and in second pivot opening 9 in the second cylindrical section 3*b*. The adjustable connector 1, in accordance with at least one possible exemplary embodiment, can be pivoted about a vertical rotational axis essentially parallel or parallel to said pin or rod 8 to any angular position from a fully open position, as shown in FIG. 28A, in which the light fixtures are oriented at a 170-degree angle A with respect to one another, to a fully closed position, as shown in FIG. 28B, in which the light fixtures are oriented at a 90-degree angle B with respect to one another. In the embodiment shown, 170-degrees is the maximum angular adjustment, though angles up to 180 degrees would be possible, in accordance with at least one possible exemplary embodiment.

The adjustable connector 1 includes a locking structure 4, such as a screw or bolt or similar structure, that can be tightened or screwed in to lock the adjustable connector 1 at a desired angular orientation. The locking structure 4 can be loosened or unscrewed to permit further adjustment of the angular orientation to a different desired angular orientation. Unlike the fixed connectors disclosed herein, the adjustable connector 1 can be adjusted over and over again until a desired angular orientation within the range of angular adjustments is achieved. The adjustable connector 1 also includes a guide slot 7 for the locking structure 4 to control the minimum and maximum angular adjustment or pivoting. The locking structure 4, upon assembly, is inserted through the first cylindrical section 2*b* via the guide slot 7 and into a receiving hole 5 in the second cylindrical section 3*b*. To perform an adjustment from, for example, the fully opened angle A, shown in FIG. 28A, to another angular position, such as the fully closed angle B, the locking structure 4 is displaced axially away from the receiving hole 5 until to loosen the locking structure 4. The loosening disengages the head of the locking structure 4 out of clamping engagement with a shoulder portion of the slot 7, thereby permitting the first and second body portions 2*b*, 3*b* to be rotated or pivoted relatively with respect to one another. The head of the locking structure 4 is guided within the slot 7, which has a curved shape designed to control the relative movement of the first and second body portions 2*b*, 3*b*. At any point along the slot 7, the locking structure 4 can be inserted axially back into the receiving hole 5 to clamp the first and second body portions 2*b*, 3*b* in place at a desired angular position, anywhere in the range of 90 degrees to 170 degrees according to the embodiment shown in FIGS. 28A and 28B. The slot 7 has a defined length such that the movement of the locking structure 4 is restricted, wherein the ends of the slot 7 correspond to an angular position of 90 degrees and an angular position of 170 degrees. Accordingly, the slot 7 does not permit an angular adjustment outside this range, but does permit an angular adjustment to any angle of any amount or value within this range, in whole degrees or tenths of degrees or hundredths of degrees. FIG. 28A shows a top view of the adjustable connector 1 at a first angular position, wherein the first body portion 2 and the second body portion 3 define or are oriented at an angle A of 170 degrees or about 170 degrees. FIG. 28B shows a top view of the adjustable connector 1 at a second angular position, wherein the first body portion 2 and the second body portion 3 define or are oriented at an angle B of 90 degrees or about 90 degrees.

The adjustable connector 1 also includes a channel 6 to permit the passage of wiring 15 therethrough to provide power to the lighting elements. No matter the angular adjustment, the channel 6 permits the wiring 15 to pass through. The slot 7, in conjunction with a first stop surface 35 and a second stop surface 36, prevents the adjustable connector 1 from being pivoted such that the wiring 15 would be damaged or cut by the intersection or overlap of interior wall surfaces or edges in a scissor-like manner. The channel 6 is defined by two interior surfaces of the first cylindrical section 2*b*, namely first channel surface 33 and second channel surface 34, each of which has a similar contour to define a relatively consistent width of the channel 6. With reference to FIG. 28C, the guide section 3*a* is essentially formed by two relatively flat or planar projecting portions or legs that define a passage way for the wiring 15. These portions comprise a first guide surface 30 and a second guide surface 31. As seen in FIG. 28A, when the adjustable connector 1 has been pivoted into the first angular position, the second channel surface 34 of the channel 6 is aligned with or essentially aligned with the second guide surface 31 to form an essentially continuous surface or guide. Since the adjustable connector 1 cannot be rotated or pivoted past this position, the second guide surface 31 cannot overlap the channel 6 and partially or fully block or cover the channel 6. Further, there is no risk of a scissors-like engagement between the second guide surface 31 and the first channel surface 33, which could damage the wiring 15. As seen in FIG. 28B, when the adjustable connector 1 has been pivoted into the second angular position, the first channel surface 33 of the channel 6 is aligned with or essentially aligned with the first guide surface 30 to form an essentially continuous surface or guide. Since the adjustable connector 1 cannot be rotated or pivoted past this position, the first guide surface 30 cannot overlap the channel 6 and partially or fully block or cover the channel 6. Further, there is no risk of a scissors-like engagement between the first guide surface 30 and the second channel surface 34, which could damage the wiring 15.

The guide section 3*a*, as seen in FIG. 28C, is essentially hollow, that is, it defines a guide space between the first guide surface 30 and the second guide surface 31. The wiring 15 is positioned to exit the channel 6 and enter this guide space. The guide section 3*a* is designed such that no matter what the angular position of the adjustable connector 1, that is, any angular position between and including the first angular position in FIG. 28A and the second angular position in FIG. 28B, the wiring 15 has space to exit the channel 6 and enter the guide section 3*a* without being obstructed or impinged. Such a design permits the unlimited adjustability of the adjustable connector 1 while allowing for the wiring 15 to connect a plurality of lighting fixtures in a chain or in series to as little as one power source. Fixed designs as shown herein allow such an arrangement of multiple lighting fixtures, but of course have the disadvantage of no adjustability and therefore limited design options. Some adjustable designs can allow for adjustability, but they require multiple independent power sources because there is no way for the wiring to pass through the connecting structures from one lighting fixture to the next. The adjustable connector 1 permits the use of one power source to power a plurality of light fixtures by allowing one unit of wiring 15 to pass through the adjustable connector 1 from one light fixture to the next and so on, but without restricting the adjustable connector 1 to a single fixed position or orientation.

With reference to FIG. 28C, since the guide channel 6 is formed in the first cylindrical section 2*b*, it is fixed in position with relationship to the rectangular section 2*a* of the first body portion 2. The rectangular section 2*a*, like the guide section 3*a*, also defines a hollow guide space or passage for the wiring 15. The rectangular section 2*a* comprises a third guide surface 32, which is like the first and second guide surfaces 30, 31. Regardless of the angular position of the adjustable connector 1, the first channel surface 33 of the channel 6 is aligned with or essentially aligned with the third guide surface 32 to form an essentially continuous surface or guide for the wiring 15. Due to the fixed relationship of the first channel surface 33 and the third guide surface 32, there is no risk of overlap, and the width of the guide space defined by the rectangular section 2*a* would be smaller than shown in FIG. 28C, that is, the space could be smaller. However, the size of the guide spaces in both the rectangular section 2*a* and the guide section 3*a* also allow for the wiring 15 to exit and/or enter the adjustable connector 1 at different positions within in the guide spaces in accordance with the design and arrangement of the light fixtures.

Figure 33A:
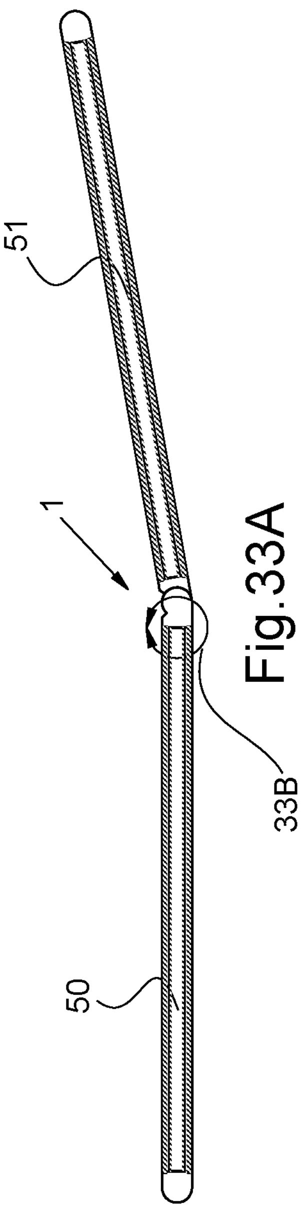
FIG. 33A shows a cross-sectional view of the first light fixture arrangement according to FIG. 33.
Figure 33:
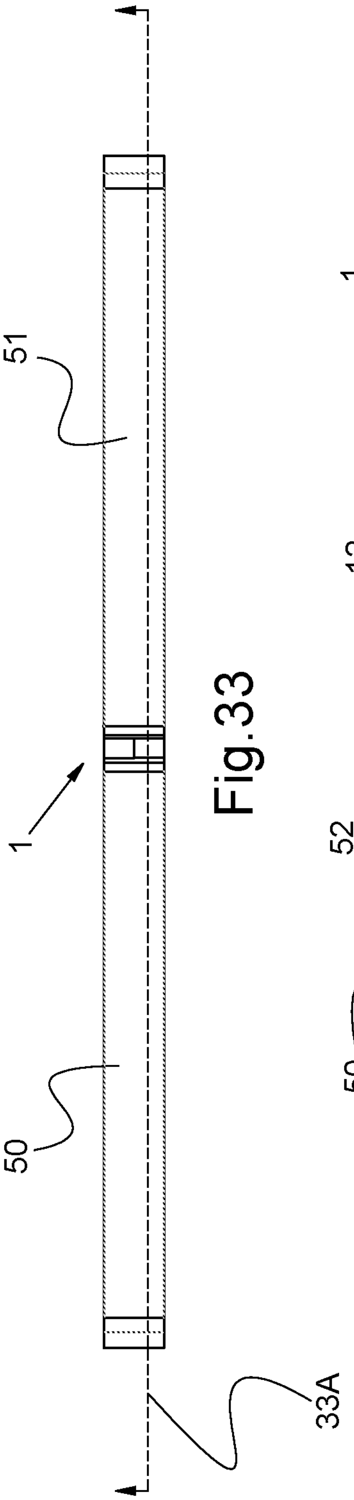
FIG. 33 shows two light fixtures connected by the adjustable connector to form a first light fixture arrangement, in accordance with at least one possible exemplary embodiment.

The adjustable connector 1 also is designed to connect to the connector bracket 20. Specifically, in the embodiment shown in FIG. 28, there are two connector brackets 20, one connected to the first body portion 2 and another connected to the second body portion 3. These connector brackets 20 are used to connect the adjustable connector 1 to a first lighting unit 50 and a second lighting unit 51, as shown in FIG. 33. The first and second lighting units 50, 51 can be designed using any reasonable combination of the lighting components disclosed herein. As seen in FIG. 28C, the rectangular section 2*a* comprises a first bumpout 12. A first recess 16 is formed in the rectangular section 2*a* and partially in the first bumpout 12. The first recess 16 is designed to receive a mounting tab 21 of a connector bracket 20. A securing device 11, such as a rivet or screw or bolt, can be inserted through an opening 22 in the mounting tab 21 (see FIG. 29) and into a receiving hole in the first recess 16. The second body portion 3 comprises a second bumpout 13 and a second recess 17 (see FIG. 31A) similar to the first bumpout 12 and the first recess 16. Another connector bracket 20 can be connected to the second body portion 3 in the second recess 17.

Figure 31:
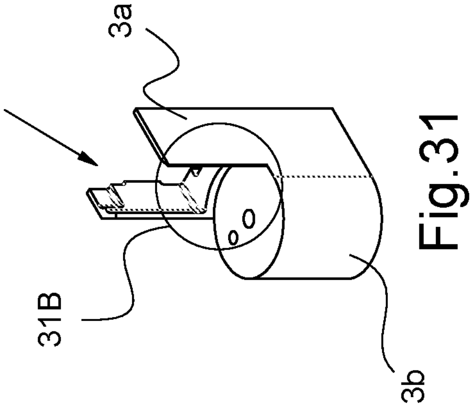
FIG. 31 shows a front perspective view of the second body portion of the adjustable connector.
Figure 31A:
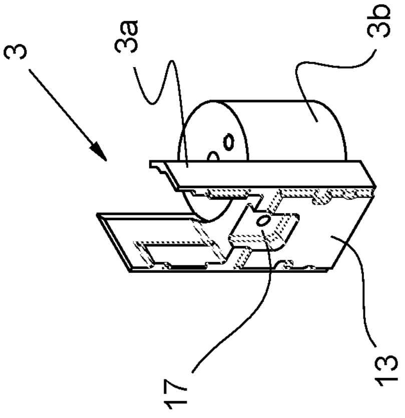
FIG. 31A shows a back perspective view of the second body portion.
Figure 31B:
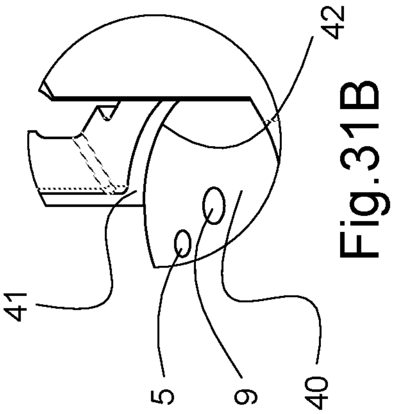
FIG. 31B shows a close up view of a portion of the second body portion circled in FIG. 31.
Figure 31C:
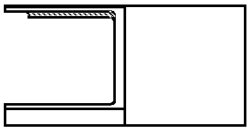
FIGS. 31C-31G show front, back, left, right, and top views, respectively, of the second body portion.
Figure 31D:
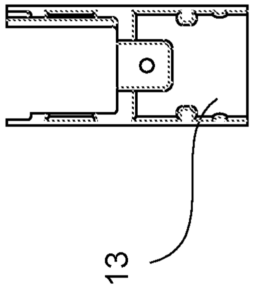
Figure 31E:
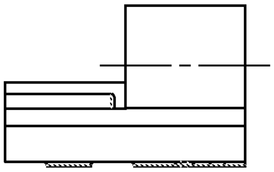
Figure 31F:
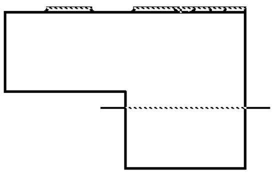
Figure 31G:
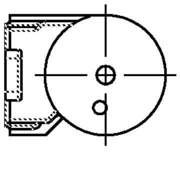

FIG. 31 shows a front perspective view of the second body portion 3 of the adjustable connector 1. FIG. 31A shows a back perspective view of the second body portion 3. FIG. 31B shows a close up view of a portion of the second body portion 3 circled in FIG. 31. As seen in FIG. 31B, the second cylindrical section 3*b* comprises a second circular surface 40. The guide section 3*a* comprises a second curved guide surface 41. A second curved edge or corner 42 is formed or defined at the intersection of the second circular surface 40 and the second curved guide surface 41, which together define a 90-degree or essentially 90-degree angle at the second curved edge or corner 42. The second curved edge or corner 42 can be formed as a true corner at a 90-degree angle, such as with a zero-degree radius, or can have a slight curvature or bevel at the transition point. FIGS. 31C-31G show front, back, left, right, and top views, respectively, of the second body portion.

Figures 32, 32A, 32B, 32C, 32D, 32E, 32F, 32G, 32H:
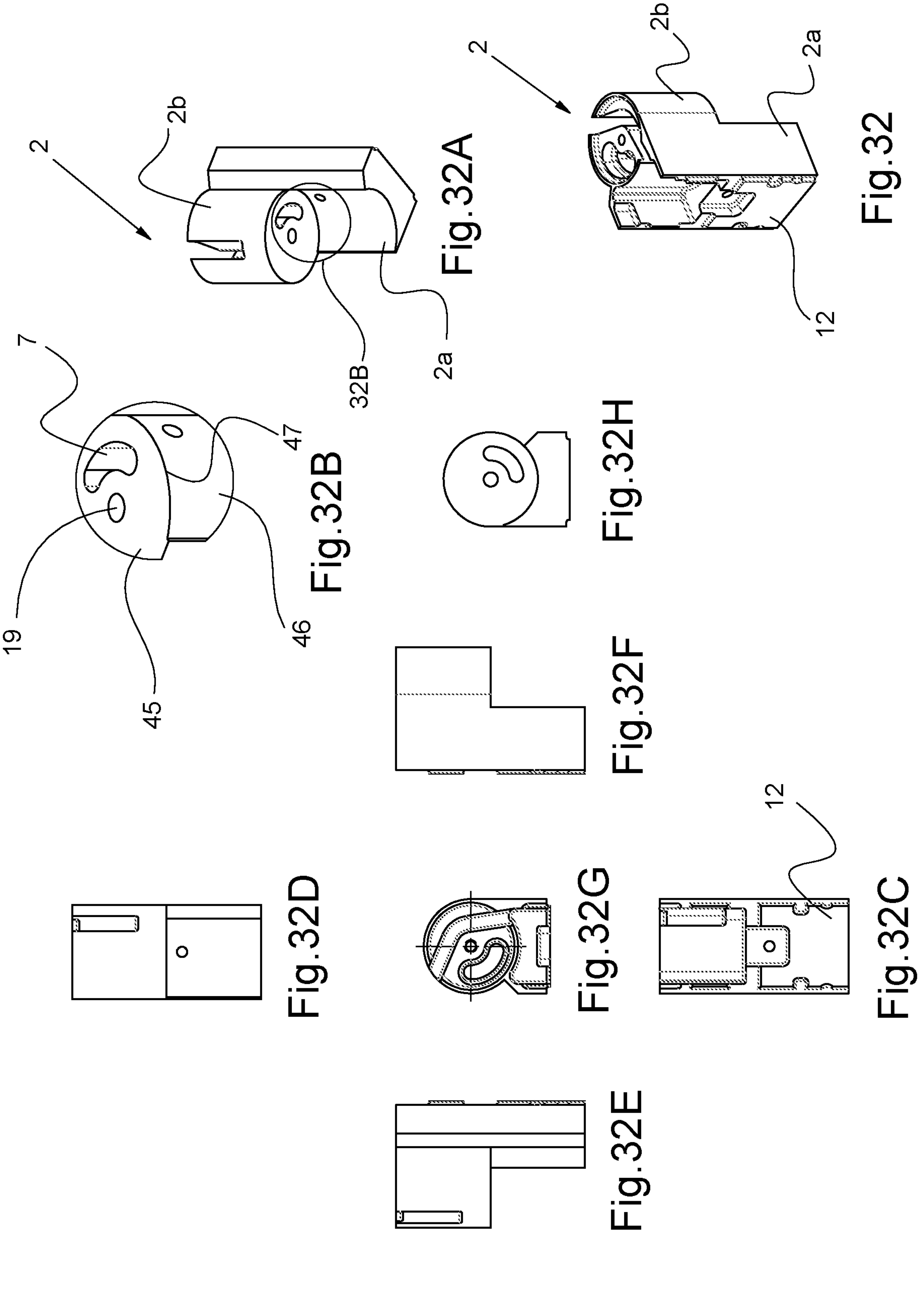
FIG. 32 shows a front perspective view of the first body portion of the adjustable connector.
FIG. 32A shows a back perspective view of the first body portion.
FIG. 32B shows a close up view of a portion of the first body portion circled in FIG. 32A.
FIGS. 32C-32H show front, back, left, right, and top views, respectively, of the first body portion.

FIG. 32 shows a front perspective view of the first body portion 2 of the adjustable connector 1. FIG. 32A shows a back perspective view of the first body portion 2. FIG. 32B shows a close up view of a portion of the first body portion 2 circled in FIG. 32A. As seen in FIG. 31B, the first cylindrical section 2*b* comprises a first circular surface 45. The rectangular section 2*a* comprises a first curved guide surface 46. A first curved edge or corner 47 is formed or defined at the intersection of the first circular surface 45 and the first curved guide surface 46, which together define a 90-degree or essentially 90-degree angle at the first curved edge or corner 47. The first curved edge or corner 47 can be formed as a true corner at a 90-degree angle, such as with a zero-degree radius, or can have a slight curvature or bevel at the transition point. FIGS. 32C-32G show front, back, left, right, and top views, respectively, of the first body portion 2.

When the first and second body portions 2, 3 are assembled together, as shown in FIG. 28, the first and second cylindrical portions 2*b*, 3*b* are aligned with the first circular surface 45 facing and engaged with the second circular surface 40. The first cylindrical section 2*b* abuts the second curved guide surface 41, which acts as a centering or aligning structure to promote alignment of the first and second cylindrical portions 2*b*, 3*b*. Likewise, the second cylindrical section 3*b* abuts the first curved guide surface 46, which also acts as a centering or aligning structure.

It should be noted at this time that the structure of the adjustable connector 1 has been designed to promote a consistent and desirable aesthetic appearance. To further explain, most customers prefer that lighting installations have a smooth, continuous appearance, especially on the visible outer portions and surfaces of the housing. This can easily be achieved when using fixed connectors with fixed outer designs. However, with an adjustable-type connector made of separate parts, adjustment or movement of the parts results in different arrangements of the parts, and thus angular edges or offset positions can be created that substantially alter the appearance and aesthetic, thereby creating different appearances depending on the angular adjustment that result in an undesirable aesthetic for an overall lighting installation. In other words, it is preferably in an overall lighting installation for the different connectors, regardless of the angular positioning, to present a consistent and similar appearance and aesthetic so that the overall lighting installation has a consistent aesthetic for all connectors and lighting fixtures. The adjustable connector 1, in accordance with at least one possible exemplary embodiment, is designed to always present a smooth, continuous appearance, regardless of the angular positioning or adjustment. To achieve this, the outer side surface of the first and second body portions 2, 3 are generally designed to be tangential to the cylindrical outer surfaces of the first and second cylindrical portions 2*b*, 3*b*. With reference to FIGS. 32 and 32G, the first cylindrical section 2*b* has a curved or circular outer side surface that transitions into the straight outer side surface of the rectangular section 2*a*. As seen in FIG. 32G, that straight outer side surface is oriented at a tangent with respect to the circle defined by the first cylindrical section 2*b*. Accordingly, when the first and second body portions 2, 3 are assembled together, as seen in FIG. 28, the straight outer side surface of the rectangular section 2*a* is also oriented tangentially with respect to the curved or circular outer side surface of the second cylindrical section 3*b*, as seen in FIG. 28A. This tangential orientation is maintained throughout the angular adjustment for any angular position. As seen in FIGS. 28A and 28B, for example, the tangential orientation of the straight outer side surface of the rectangular section 2*a* to the circular outer side surface of the second cylindrical section 3*b* is the same for either the first angular position of 170 degrees or the second angular position of 90 degrees. By virtue of this design, a consistent outer appearance and aesthetic can be achieved for any angular positioning in the range of 90 degrees to 170 degrees. In the same manner, the straight outer side surface of the guide section 3*a* is also oriented tangentially with respect to the curved or circular outer side surfaces of the first and second cylindrical portions 2*b*, 3*b*. The resulting visual effect is a smooth and continuous outer surface with no easily discernible breaks or interruptions, which is a desirable aesthetic.

Figure 30:
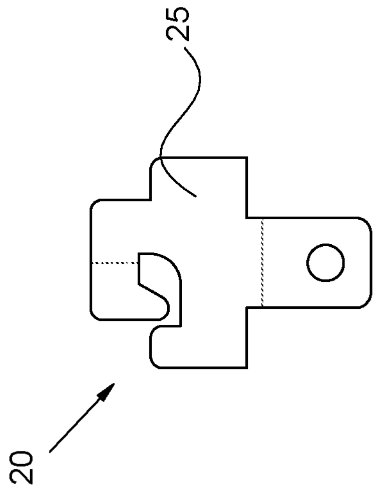
FIG. 30 shows a flattened connector bracket form prior to bending into the connector bracket shape according to FIG. 29.
Figure 29A:
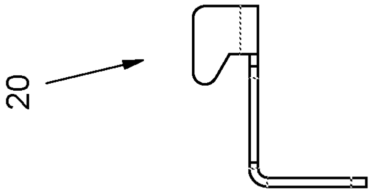
FIGS. 29A-29C show left, front, and top views of the connector bracket.
Figure 29C:
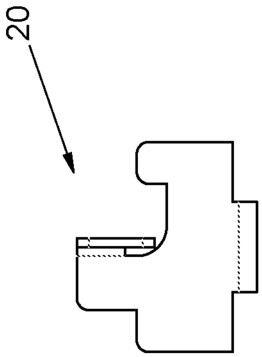
Figure 29B:
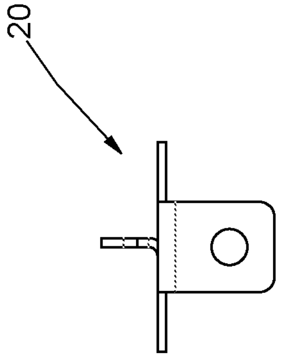

FIGS. 29A-29C show left, front, and top views of the connector bracket 20 that connects the adjustable connector 1 to the respective light fixtures. FIG. 30 shows a flattened connector bracket form 25 prior to bending into the connector bracket shape according to FIG. 29. The connector bracket 20 can be formed by bending a metallic form or blank, such as the flattened connector bracket form 25, or by any other suitable method, such as making a finished connector bracket 20 from plastic or other materials. The connector bracket 20 comprises the mounting tab 21, a projecting portion 23, and a clamping tab 24.

Figure 33B:
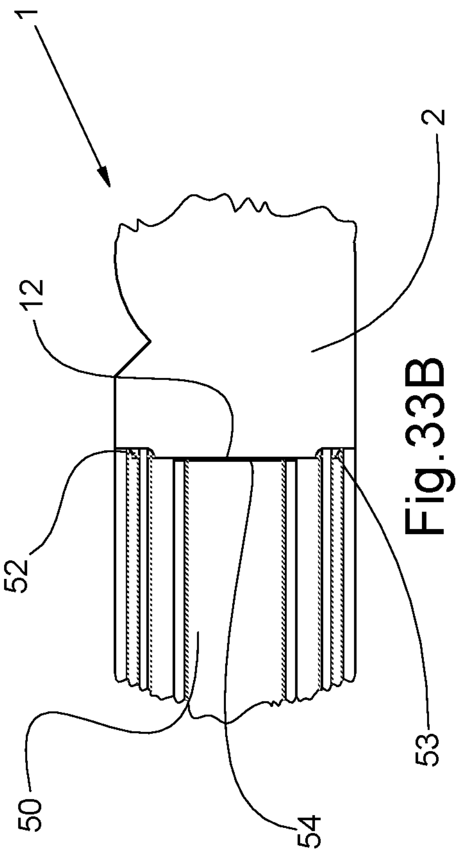
FIG. 33B shows a close up view of a portion of the first light fixture arrangement circled in FIG. 33A.

FIG. 33 shows a schematic-style representation of two light fixtures 50, 51 connected by the adjustable connector 1 at an angle to one another to form a first light fixture arrangement, in accordance with at least one possible exemplary embodiment. The relative angular positioning of the two light fixtures 50, 51 is 170 degrees or less. FIG. 33A shows a cross-sectional view of the first light fixture arrangement according to FIG. 33, and FIG. 33B shows a close up view of a portion of the first light fixture arrangement circled in FIG. 33A. As seen in FIG. 33B, the light fixture 50 is connected to the adjustable connector 1 by placing the end of the light fixture 50 against the first body portion 2. Specifically, first end portion 52 and second end portion 53 abut the outer surface surrounding the first bumpout 12. The bumpout 12 projects into a recessed portion 54 of the end of the light fixture 50. Therefore, instead of two flat surfaces meeting at this juncture, a raised surface, the bumpout 12, projects into a recessed surface, the recessed portion 54. This engagement, as discussed herein, helps minimize light leaks through the outer edges of the junction point.

Figures 34, 34A, 34B, 34C:
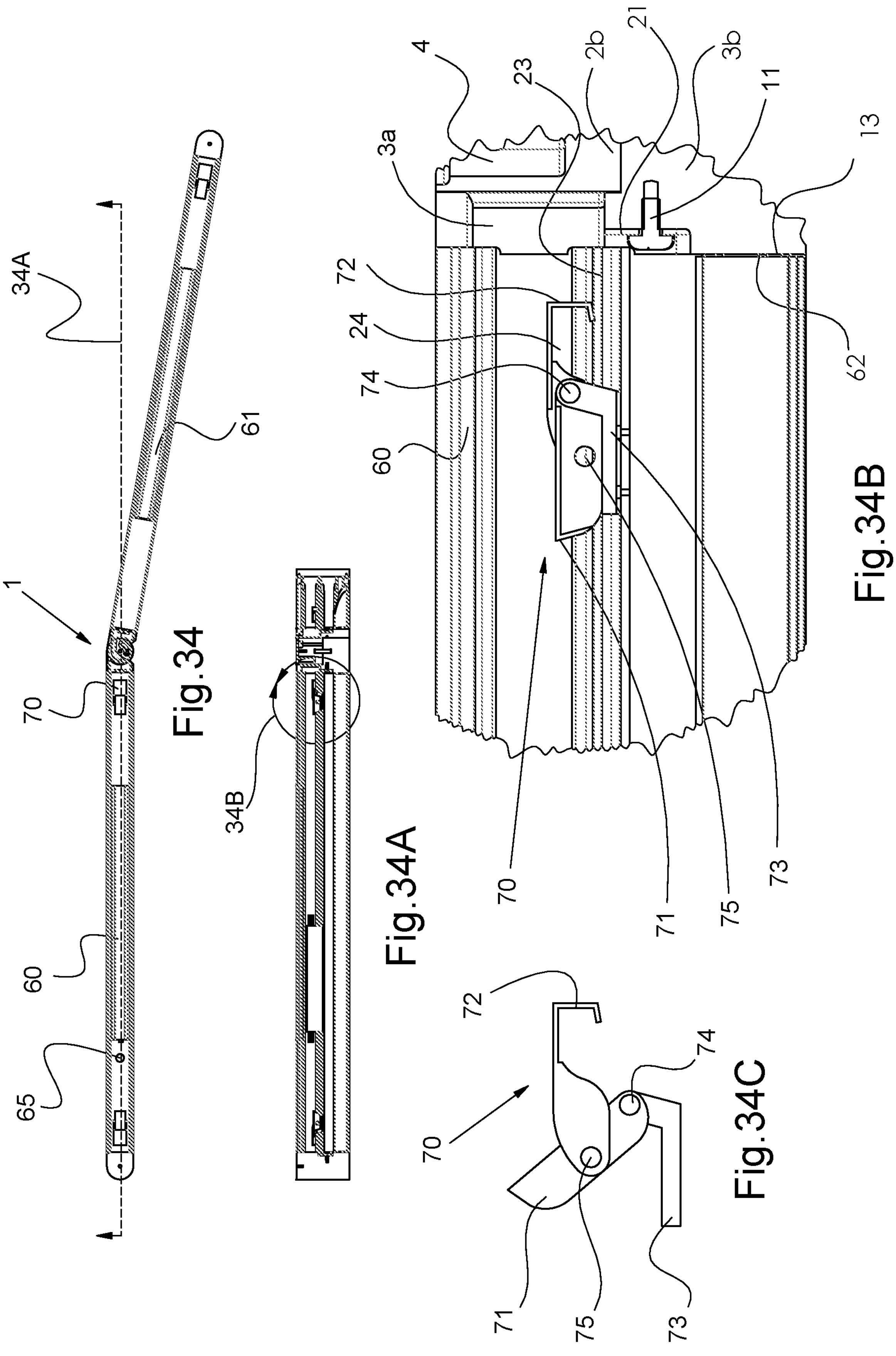
FIG. 34 shows two light fixtures connected by the adjustable connector to form a second light fixture arrangement, in accordance with at least one possible exemplary embodiment.
FIG. 34A shows a cross-sectional view of the second light fixture arrangement according to FIG. 34.
FIG. 34B shows a close up view of a portion of the second light fixture arrangement circled in FIG. 33A.
FIG. 34C shows a clamping device to secure or clamp or connect a light fixture to the adjustable connector.

FIG. 34 shows two light fixtures 60, 61 connected by the adjustable connector 1 to form a second light fixture arrangement, in accordance with at least one possible exemplary embodiment. In the second light fixture arrangement of FIG. 34, the upper or top portion of the housings of the light fixtures is partially covered by structures, which could be any type of uplight or cap or cover structure, such as the cap structure 105 or uplight structure 107. The structures do not extend over the length of their respective light fixtures 60, 61. The opening 65 is therefore visible in the top view of the second light fixture arrangement in FIG. 34. In this possible exemplary embodiment, the opening or access hole 65 is accessible from the top to allow a downlight structure or similar lighting structure to be pressed or accessed through the opening 65 using a tool, such as a screwdriver or similar, which allows a person to dislodge or pop out such a lighting structure without the need to disassemble or otherwise manipulate the light fixture arrangement, as discussed herein. In accordance with at least one possible exemplary embodiment, the cross piece 103 has one or more access holes 65 therein, depending on the size and type of the lighting structure. For example, a cross piece 103 having only one access hole 65 may be suitable for one type of lighting structure, such as a shorter lighting structure. As another example, a cross piece 103 having two or more access holes may be suitable, and possibly necessary, for another type of lighting structure, such as a longer lighting structure, as may be advantageous or necessary to push out only one portion of a lighting structure at a time, rather than the entire lighting structure in one effort. FIG. 34A shows a cross-sectional view of the second light fixture arrangement according to FIG. 34. FIG. 34B shows a close up view of a portion of the second light fixture arrangement circled in FIG. 33A. As can be seen, the second light fixture arrangement comprises a third end portion 62, into which the second bumpout 13 projects in order to seal the connection to minimize or prevent light leaks.

FIG. 34C shows a clamping device 70 to secure or clamp or connect a light fixture to the adjustable connector 1. The clamping device 70 comprises a body portion 71, a clamp arm 72, and a mounting portion 73. The body portion 71 is pivotably connected to the mounting portion at first hinge 74. The clamp arm 72 is pivotably connected to the body portion 71 at the second hinge 75. FIG. 34C shows the clamping device 70 in an unclamped or open position. FIG. 34B shows the clamping device 70 in a clamped or closed position. The clamping device 70 is mounted on or connected to the housing of the light fixture, such as on the cross piece 103, in accordance with at least one possible exemplary embodiment. To connect the light fixture 60 to the adjustable connector 1, the open clamping device 70 is closed by first positioning the clamp arm 72 loosely around the clamping tab 24 of the connector bracket 20. A user can then press the body portion 71 down toward the mounting portion 73. This motion causes the clamp arm 72 to clamp tightly onto the clamping tab 24, thereby moving the clamping device into the clamped or closed position. The engaging or pressing force between the clamping device 70 and the connector tab 20 not only locks the light fixture 60 and the adjustable connector 1 together, it also pulls the various end surfaces tightly together to produce a smooth aesthetic and minimize or prevent light leaks. If a user wishes to disconnect the light fixture 60 and the adjustable connector 1, the user can easily unclamp the connection by hand by lifting body portion 71 and loosening the clamp arm 72. The clamping device 70 therefore provides a strong and tight connection, but one that can easily be connected and disconnected by hand without the need for tools.

The following is an at least partial list of the nomenclature in the figures, in accordance with at least one possible exemplary embodiment: adjustable connector 1; first body portion 2; rectangular section 2*a*; first cylindrical section 2*b*; second body portion 3; guide section 3*a*; second cylindrical section 3*b*; locking structure 4; receiving hole 5; channel 6; guide slot 7; rod or pin 8; first pivot opening 9; securing device 11; first bumpout 12; second bumpout 13; wiring 15; first recess 16; second recess 17; second pivot opening 19; connector bracket 20; mounting tab 21; opening 22; projecting portion 23; clamping tab 24; flattened connector bracket form 25; first guide surface 30; second guide surface 31; third guide surface 32; first channel surface 33; second channel surface 34; first stop surface 35; second stop surface 36; second circular surface 40; second curved guide surface 41; second curved edge or corner 42; first circular surface 45; first curved guide surface 46; first curved edge or corner 47; light fixture 50; light fixture 51; first end portion 52; second end portion 53; recessed portion 54; light fixture 60; light fixture 61; third end portion 62; opening 65; clamping device 70; body portion 71; clamp arm 72; mounting portion 73; first hinge 74; second hinge 75; first light fixture 100; second light fixture 101; upper portion 102; cross piece 103; lower portion 104; cap structure 105; downlight structure 106; uplight structure 107; first curved leg 111; connecting portion 112; second curved leg 113; first snap-fit connecting structure 114; second snap-fit connecting structure 115; first contact portion 116; locking projection 117; second contact portion 118; slot or recess 119; support leg 120; end portion 121; light fixture housing 130; snap-fit arrangement 131; snap-fit arrangement 132; end portion 133; recess 134; connecting portion 140; first leg 141; second leg 142; first snap-fit connecting structure 143; second snap-fit connecting structure 144; locking projection 145; first contact portion 146; second contact portion 147; connecting portion 151; first snap-fit connecting structure 152; second snap-fit connecting structure 153; locking projection 154; first contact portion 155; second contact portion 156; first fixed connector or connector cap or end cap 200; first bumpout 201; second bumpout 202; second fixed connector or cross-shaped connector 210; first bumpout 211; second bumpout 212; third fixed connector or first elbow connector 220; fourth fixed connector or second elbow connector 221; fifth fixed connector or straight connector 222; sixth fixed connector or a T-shaped connector 223; seventh fixed connector or Y-shaped connector 224; first upper leg 1021; second upper leg 1022; first lower leg 1041; second lower leg 1042; first snap-fit portion 1311; second snap-fit portion 1312; first snap-fit portion 1321; second snap-fit portion 1322; angle A; and angle B.

At least one possible exemplary embodiment of the present application relates to a lighting fixture arrangement comprising: a first light fixture comprising a first elongated housing and at least one lighting element; a second light fixture comprising a second elongated housing and at least one lighting element; a connecting structure being configured and disposed to connect said first lighting fixture and said second lighting fixture; said connecting structure being adjustable to permit adjustment of the angular orientation of said first lighting fixture and said second lighting fixture with respect to one another; said connecting structure comprising: a first body portion; a second body portion; and a locking structure; said first body portion and said second body portion being movable with respect to one another to permit adjustment of said connecting structure to a desired position to achieve a desired angular orientation of said first lighting fixture and said second lighting fixture with respect to one another; said locking structure being adjustable into a lock position to lock said first body portion and said second body portion in place in said desired position; and said locking structure being adjustable into a release position to permit relative movement of said first body portion and said second body portion with respect to one another, either for an initial angular adjustment to a first angular orientation or a subsequent angular re-adjustment to a second angular orientation different from said first angular orientation.

At least one possible exemplary embodiment of the present application relates to a method of installing a lighting fixture arrangement, said lighting fixture arrangement comprising: a first light fixture comprising a first elongated housing and at least one lighting element; a second light fixture comprising a second elongated housing and at least one lighting element; a connecting structure being configured and disposed to connect said first lighting fixture and said second lighting fixture; said connecting structure being adjustable to permit adjustment of the angular orientation of said first lighting fixture and said second lighting fixture with respect to one another; said connecting structure comprising: a first body portion; a second body portion; and a locking structure; said first body portion and said second body portion being movable with respect to one another to permit adjustment of said connecting structure to a desired position to achieve a desired angular orientation of said first lighting fixture and said second lighting fixture with respect to one another; said locking structure being adjustable into a lock position to lock said first body portion and said second body portion in place in said desired position; and said locking structure being adjustable into a release position to permit relative movement of said first body portion and said second body portion with respect to one another, either for an initial angular adjustment to a first angular orientation or a subsequent angular re-adjustment to a second angular orientation different from said first angular orientation; and the method comprising: adjusting said connecting structure to an initial desired position by relatively moving said first body portion and said second body portion with respect to one another to achieve a desired angular orientation of said first lighting fixture and said second lighting fixture with respect to one another; adjusting said locking structure into a lock position to lock said first body portion and said second body portion in place in said initial desired position; analyzing the orientation of said first lighting fixture and said second lighting fixture as part of an overall installation and one of (A) and (B): (A) upon determining that said first lighting fixture and said second lighting fixture are in said desired angular orientation, concluding adjusting of said connecting structure; and (B) adjusting said locking structure into a release position and then repeating said steps of adjusting said connecting structure, adjusting said locking structure into said lock position, and analyzing the orientation until said first lighting fixture and said second lighting fixture are in said desired angular orientation.

At least one possible exemplary embodiment of the present application relates to, in a lighting fixture arrangement comprising a first elongated light fixture and a second elongated light fixture, a connecting structure being configured to adjustably connect said first lighting fixture and said second lighting fixture, said connecting structure comprising: a first body portion; a second body portion; a locking structure; said first body portion and said second body portion being movable with respect to one another to permit adjustment of said connecting structure to a desired position to achieve a desired angular orientation of said first lighting fixture and said second lighting fixture with respect to one another; said locking structure being adjustable into a lock position to lock said first body portion and said second body portion in place in said desired position; and said locking structure being adjustable into a release position to permit relative movement of said first body portion and said second body portion with respect to one another, either for an initial angular adjustment to a first angular orientation or a subsequent angular re-adjustment to a second angular orientation different from said first angular orientation.

At least one possible exemplary embodiment of the present application relates to a light fixture connector configured to connect a first light fixture and a second light fixture in a light fixture arrangement configured to provide light to a portion of a commercial or residential building or an office or room within a commercial or residential building or structure, said light fixture connector comprising: a first body portion being configured to be connected to a first light fixture having an elongated shape and at least one first lighting element; a second body portion being configured to be connected to a second light fixture having an elongated shape and at least one second lighting element; said first and second body portions being configured and disposed to be moved relative to one another to any angular orientation in a predetermined range of angular orientations to thereby orient first and second light fixtures in a desired angular position; a locking arrangement being configured to be placed in an open position to permit relative movement of said first and second body portions to any angular orientation in said predetermined range; and said locking arrangement being configured to be placed in a lock position to lock said first and second body portions in place at any angular orientation in said predetermined range.

At least one other possible exemplary embodiment of the present application relates to the light fixture, wherein said connecting structure comprises a passage configured and disposed to permit power wiring from a first light fixture to pass through said connecting structure to a second light fixture to permit transfer of power from a single power source in a daisy chain or serial connection.

At least one other possible exemplary embodiment of the present application relates to the light fixture connector, wherein said passage is configured to guide said wiring through said connecting structure at any angular orientation of said first and second body portions in said predetermined range.

At least one other possible exemplary embodiment of the present application relates to the light fixture connector, wherein: said passage comprises a channel disposed in said first body portion, which channel comprises a first end and a second end a first opening disposed in said first body portion and connected to said first end of said channel; and a second opening disposed in said second body portion and operatively connected to said second end of said channel; said first opening is disposed in a fixed position with respect to said first end of said channel to permit wiring to pass between said first opening and said first end of said channel at any angular orientation of said first and second body portions in said predetermined range said second opening is movable with respect to said second end of said channel; and said second opening has a width sufficient to maintain connection with said second end of said channel at any angular orientation of said first and second body portions in said predetermined range to permit said wiring to pass between said second opening and said second end of said channel at any angular orientation of said first and second body portions in said predetermined range.

At least one other possible exemplary embodiment of the present application relates to the light fixture connector, wherein said first body portion comprises a first section having a substantially cylindrical shape and a second section having a substantially rectangular shape said second body portion comprises a third section having a substantially cylindrical shape and a fourth section having a substantially rectangular shape said first and third sections are rotatable about a central axis of rotation; and said first, cylindrical, section is aligned coaxially with said third, cylindrical, section and each is configured and disposed to present a continuous cylindrical outer surface at any angular orientation of said first and second body portions in said predetermined range.

At least one other possible exemplary embodiment of the present application relates to the light fixture connector, wherein each of said second and fourth, rectangular, sections comprises first and second planar side surfaces configured and disposed to extend tangentially from the cylindrical outer surfaces of each of said first and third, cylindrical, sections to produce an appearance of a smooth, tangential transition between said planar side surfaces and said cylindrical outer surfaces at any angular orientation of said first and second body portions in said predetermined range said first and second planar side surfaces of each of said second and fourth, rectangular, sections are configured to be disposed in alignment with outer planar surfaces of first and second light fixtures to produce an appearance of a continuous planar surface at a connection point; and each of said second and fourth, rectangular, sections comprises an angled stop surface configured and disposed to extend inwardly from its second planar side surface and substantially radially to said central axis of rotation, which angled stop surfaces engage one another upon said first and second body portions being oriented at 90-degrees to one another.

At least one other possible exemplary embodiment of the present application relates to the light fixture connector, wherein said locking arrangement comprises a locking structure comprising a head portion and a shaft portion a guide slot disposed in said first body portion and having a first width essentially the same as the diameter of said head portion a receiving hole disposed in said second body portion and configured to receive and hold an end of said shaft portion said locking structure is disposed to pass through said guide slot and into said receiving hole with said head portion disposed at least partially in said guide slot said guide slot comprises a shoulder at which said guide slot has a second width less than said first width and essentially the same as the diameter of said shaft portion said locking structure is axially movable toward said second body portion to bring said head portion into engagement with said shoulder and exert a clamping force to clamp together said first and second body portions at any angular orientation of said first and second body portions in said predetermined range said locking structure is axially movable away from said second body portion to bring said head portion out of engagement with said shoulder to permit said first and second body portions to be moved to any angular orientation of said first and second body portions in said predetermined range; and said guide slot is configured, upon relative rotational movement of said first and second body portions, to engage with said head portion of said locking structure to help maintain alignment of said first and second body portions and to limit the relative rotational movement such that said first and second body portions are not moved to an angular orientation outside of said predetermined range, which predetermined range is 90 degrees to 170 degrees.

At least one other possible exemplary embodiment of the present application relates to the light fixture connector, in combination with a first light fixture and a second light fixture adjustably connected by said light fixture connector, wherein each of said first and second light fixtures comprises a housing being elongated and having a substantially H-shaped cross-sectional profile; and a lighting element being connected to said housing along a portion of the length of said housing said housing comprises a first side piece, a second side piece, and a crosspiece said crosspiece is configured and disposed to connect said first and second side pieces at a central portion thereof and to define said substantially H-shaped cross-sectional profile said crosspiece is configured and disposed to divide said housing into a first open chamber bordered by a first portion of said first side piece and a first portion of said second side piece, and a second open chamber bordered by a second portion of said first side piece and a second portion of said second side piece each of said first portions comprises a recess disposed at the ends of said first portions adjacent the opening into said first open chamber said lighting element comprises a first leg, a second leg, and a connecting portion disposed transverse to and to connect said first leg and said second leg said lighting element comprises a resilient material to permit temporary displacement of said first and second legs with respect to said connecting portion each of said first and second legs comprises a projection configured to essentially match said recesses in said first portions of said first and second side pieces of said housing, which projections are configured and disposed to engage and seat in said recesses to hold said lighting element in said housing in a snap-fit connection said first and second legs of said lighting element are configured to flex inwardly to permit manual movement of said lighting element into or out of said first open chamber in a direction essentially or substantially perpendicular to said crosspiece said crosspiece comprises at least one opening therein to permit insertion of a tool by a user through said second open chamber, through said crosspiece, into said first open chamber, and into contact with said connecting portion of said lighting element to permit a user to manually push said lighting element out of said first open chamber in a direction essentially or substantially perpendicular to said crosspiece each of said second portions of said first and second side pieces comprises a recess disposed at the ends of said second portions adjacent the opening into said second open chamber; and said recesses in said second open chamber are configured and disposed in a similar manner as said recesses in said first open chamber to permit snap-fit installation and connection of at least one of: another lighting element and a cover element.

At least one other possible exemplary embodiment of the present application relates to the light fixture connector, in combination with said first light fixture and said second light fixture adjustably connected by said light fixture connector, wherein said light fixture connector comprises a first connector bracket configured and disposed to connect to said first light fixture; and a second connector bracket configured and disposed to connect to said second light fixture each of said first and second connector brackets comprises a clamping tab structure being configured and disposed to project into their respective second open chambers adjacent to or in contact with said second surfaces of said crosspieces each of said first and second light fixtures comprises a clamping device being mounted on said second surface of said crosspiece and configured to clamp onto said connector bracket said clamping device being disposed to be manually accessible to a user through the open end of said second open chamber said clamping device comprising a mounting portion being configured and disposed to mount said clamping device on said crosspiece; and a clamping portion being pivotably connected to said mounting portion; and said clamping portion being configured to be manually moved and pressed onto said clamping tab structure in a form fit and clamping engagement to permit manual connection of its light fixture and said light fixture connector without the use of tools; and said clamping portion being configured to be manually moved and pulled off of said clamping tab structure to disengage said clamping device from said clamping tab structure to permit manual disconnection of its light fixture and said light fixture connector without the use of tools.

At least one other possible exemplary embodiment of the present application relates to the light fixture connector, wherein said first body portion comprises a first section having a substantially cylindrical shape and a second section having a substantially rectangular shape said second body portion comprises a third section having a substantially cylindrical shape and a fourth section having a substantially rectangular shape said first and third sections are rotatable about a central axis of rotation; and said first, cylindrical, section is aligned coaxially with said third, cylindrical, section and each is configured and disposed to present a continuous cylindrical outer surface at any angular orientation of said first and second body portions in said predetermined range.

At least one other possible exemplary embodiment of the present application relates to the light fixture connector, wherein each of said second and fourth, rectangular, sections comprises first and second planar side surfaces configured and disposed to extend tangentially from the cylindrical outer surfaces of each of said first and third, cylindrical, sections to produce an appearance of a smooth, tangential transition between said planar side surfaces and said cylindrical outer surfaces at any angular orientation of said first and second body portions in said predetermined range said first and second planar side surfaces of each of said second and fourth, rectangular, sections are configured to be disposed in alignment with outer planar surfaces of first and second light fixtures to produce an appearance of a continuous planar surface at a connection point; and each of said second and fourth, rectangular, sections comprises an angled stop surface configured and disposed to extend inwardly from its second planar side surface and substantially radially to said central axis of rotation, which angled stop surfaces engage one another upon said first and second body portions being oriented at 90-degrees to one another.

At least one other possible exemplary embodiment of the present application relates to the light fixture connector, wherein said locking arrangement comprises a locking structure comprising a head portion and a shaft portion a guide slot disposed in said first body portion and having a first width essentially the same as the diameter of said head portion a receiving hole disposed in said second body portion and configured to receive and hold an end of said shaft portion said locking structure is disposed to pass through said guide slot and into said receiving hole with said head portion disposed at least partially in said guide slot said guide slot comprises a shoulder at which said guide slot has a second width less than said first width and essentially the same as the diameter of said shaft portion said locking structure is axially movable toward said second body portion to bring said head portion into engagement with said shoulder and exert a clamping force to clamp together said first and second body portions at any angular orientation of said first and second body portions in said predetermined range said locking structure is axially movable away from said second body portion to bring said head portion out of engagement with said shoulder to permit said first and second body portions to be moved to any angular orientation of said first and second body portions in said predetermined range; and said guide slot is configured, upon relative rotational movement of said first and second body portions, to engage with said head portion of said locking structure to help maintain alignment of said first and second body portions and to limit the relative rotational movement such that said first and second body portions are not moved to an angular orientation outside of said predetermined range, which predetermined range is 90 degrees to 170 degrees.

At least one possible exemplary embodiment of the present application relates to a method of adjusting the light fixture connector, wherein said method comprises relatively moving said first and second body portions, while using the interaction of said head portion and said guide slot as a guide, to a first angular orientation corresponding to a first desired angular position of first and second light fixtures in a predetermined range of 90 degrees to 170 degrees; placing said locking arrangement in said closed position by: axially moving said locking structure toward said second body portion, bringing said head portion into engagement with said shoulder, and exerting a clamping force to clamp and lock together said first and second body portions in said first angular orientation placing said locking arrangement in said open position by: axially moving said locking structure away from said second body portion, bringing said head portion out of engagement with said shoulder, and releasing said clamping force relatively moving said first and second body portions, while using the interaction of said head portion and said guide slot as a guide, to a second, different, angular orientation corresponding to a second, different, desired angular position of first and second light fixtures in a predetermined range of 90 degrees to 170 degrees; and placing said locking arrangement in said closed position to lock said first and second body portions in said second, different, angular orientation.

At least one possible exemplary embodiment of the present application relates to a method of adjusting the light fixture connector, wherein said method comprises relatively moving said first and second body portions to a first angular orientation corresponding to a first desired angular position of first and second light fixtures; placing said locking arrangement in said closed position to lock said first and second body portions in said first angular orientation placing said locking arrangement in said open position relatively moving said first and second body portions to a second, different, angular orientation corresponding to a second, different, desired angular position of first and second light fixtures; and placing said locking arrangement in said closed position to lock said first and second body portions in said second, different, angular orientation.

At least one possible exemplary embodiment of the present application relates to a light fixture configured to provide light to a portion of a commercial or residential building or an office or room within a commercial or residential building or structure, said light fixture comprising a housing being elongated and having a substantially H-shaped cross-sectional profile a lighting element being connected to said housing along a portion of the length of said housing said housing comprising a first side piece, a second side piece, and a crosspiece said crosspiece being configured and disposed to connect said first and second side pieces at a central portion thereof and to define said substantially H-shaped cross-sectional profile said crosspiece being configured and disposed to divide said housing into a first open chamber bordered by a first portion of said first side piece and a first portion of said second side piece, and a second open chamber bordered by a second portion of said first side piece and a second portion of said second side piece each of said first portions comprising a recess disposed at the ends of said first portions adjacent the opening into said first open chamber said lighting element comprising a first leg, a second leg, and a connecting portion disposed transverse to and to connect said first leg and said second leg said lighting element comprising a resilient material to permit temporary displacement of said first and second legs with respect to said connecting portion each of said first and second legs comprising a projection configured to essentially match said recesses in said first portions of said first and second side pieces of said housing, which projections are configured and disposed to engage and seat in said recesses to hold said lighting element in said housing in a snap-fit connection; and said first and second legs of said lighting element being configured to flex inwardly to permit manual movement of said lighting element into or out of said first open chamber in a direction essentially or substantially perpendicular to said crosspiece.

At least one other possible exemplary embodiment of the present application relates to the light fixture, wherein said crosspiece comprises at least one opening therein to permit insertion of a tool by a user through said second open chamber, through said crosspiece, into said first open chamber, and into contact with said connecting portion of said lighting element to permit a user to manually push said lighting element out of said first open chamber in a direction essentially or substantially perpendicular to said crosspiece.

At least one other possible exemplary embodiment of the present application relates to the light fixture, wherein each of said second portions of said first and second side pieces comprises a recess disposed at the ends of said second portions adjacent the opening into said second open chamber; and said recesses in said second open chamber are configured and disposed in a similar manner as said recesses in said first open chamber to permit snap-fit installation and connection of at least one of: another lighting element and a cover element.

At least one possible exemplary embodiment of the present application relates to a method of installing the light fixture, wherein said method comprises manually moving said lighting element into said first open chamber in a direction essentially or substantially perpendicular to said crosspiece before or after installation of end caps or covers on the ends of said housing.

At least one possible exemplary embodiment of the present application relates to a method of repairing the light fixture upon detection of a defective or malfunctioning lighting element, wherein said method comprises inserting a tool through said second open chamber, through said opening in said crosspiece, into said first open chamber, and into contact with said connecting portion of said lighting element, and then manually pushing said lighting element out of said first open chamber in a direction essentially or substantially perpendicular to said crosspiece, without removing end caps or covers on the ends of said housing.

At least one possible exemplary embodiment of the present application relates to a light fixture arrangement configured to provide light to a portion of a commercial or residential building or an office or room within a commercial or residential building or structure, said light fixture arrangement comprising a light fixture comprising a housing being elongated and having a substantially H-shaped cross-sectional profile a lighting element being connected to said housing along a portion of the length of said housing said housing comprising a first side piece, a second side piece, and a crosspiece said crosspiece being configured and disposed to connect said first and second side pieces at a central portion thereof and to define said substantially H-shaped cross-sectional profile said crosspiece being configured and disposed to divide said housing into a first open chamber and a second open chamber; and said crosspiece comprising a first surface disposed to face into said first open chamber and a second surface disposed opposite said first surface and to face into said second open chamber a light fixture end structure comprising one of a light fixture connector being configured to cover an end of said light fixture housing and connect said light fixture to another light fixture or a wall structure; and a light fixture end cap being configured to cover a free end of said light fixture housing a connector bracket being mounted on said light fixture end structure said connector bracket comprising a clamping tab structure being configured and disposed to project out from said light fixture end structure and into said second open chamber of said housing adjacent to or in contact with said second surface of said crosspiece a clamping device being mounted on said second surface of said crosspiece and configured to clamp onto said connector bracket to connect said light fixture and said light fixture end structure said clamping device being disposed to be manually accessible to a user through the open end of said second open chamber said clamping device comprising a mounting portion being configured and disposed to mount said clamping device on said crosspiece; and a clamping portion being pivotably connected to said mounting portion said clamping portion being configured to be manually moved and pressed onto said clamping tab structure in a form fit and clamping engagement to permit manual connection of said light fixture and said light fixture end structure without the use of tools; and said clamping portion being configured to be manually moved and pulled off of said clamping tab structure to disengage said clamping device from said clamping tab structure to permit manual disconnection of said light fixture and said light fixture end structure without the use of tools.

Any numerical values disclosed herein, if any, should be understood as disclosing all approximate values within plus or minus ten percent of the numerical value. Any ranges of numerical values disclosed herein, if any, should be understood as disclosing all individual values within the range of values, including whole numbers, tenths of numbers, or hundredths of numbers.

The entirety of the appended drawings, including all dimensions, proportions, and/or shapes disclosed thereby or reasonably understood therefrom, are hereby incorporated by reference.

All of the patents, patent applications, patent publications, and other documents cited herein, are hereby incorporated by reference as if set forth in their entirety herein.

The following patents, patent applications, patent publications, and other documents cited in the corresponding foreign or international patent applications listed in the preceding paragraph are hereby incorporated by reference as if set forth in their entirety herein, as follows:

The following patents, patent applications, patent publications, and other documents are hereby incorporated by reference as if set forth in their entirety herein, as follows: U.S. patent application Ser. No. 16/795,153, filed Feb. 19, 2020 and entitled COUPLERS FOR LIGHT FIXTURES; U.S. patent application Ser. No. 15/299,168, filed Oct. 20, 2016 and entitled COUPLERS FOR LIGHT FIXTURES, now granted as U.S. Pat. No. 10,215,380; U.S. patent application Ser. No. 16/256,356, filed Jan. 24, 2019 and entitled COUPLERS FOR LIGHT FIXTURES, now granted as U.S. Pat. No. 10,584,857; U.S. Pat. App. No. 62/820,083 filed Mar. 18, 2019 and entitled MOUNT INTERFACE FOR LIGHT FIXTURES; U.S. patent application Ser. No. 16/723,665 filed Dec. 20, 2019 and entitled MOUNT INTERFACE FOR LIGHT FIXTURES; and "Specification Data Line 100 DN (LN1-W1)" published May 2022, Fluxwerx Illumination, 9255 194 St, Surrey, BC V4N 4G1, Canada.

Although the invention has been described in detail for the purpose of illustration of any embodiments disclosed herein, including the most practical or preferred embodiments at the time of filing of this application, it is to be understood that such detail is solely for that purpose and that the invention is not limited to such embodiments, but, on the contrary, is intended to cover modifications and equivalent arrangements that are within the spirit and scope of the present application, including the specification and the claims as originally filed, as amended, or as issued. For example, it is to be understood that the present invention contemplates that, to the extent possible, one or more features or components of any disclosed embodiment can be combined with one or more features or components of any other disclosed embodiment.

What is claimed is:

1. A light fixture connector configured to connect a first light fixture and a second light fixture in a light fixture arrangement configured to provide light to a portion of a commercial or residential building or an office or room within a commercial or residential building or structure, said light fixture connector comprising:

- a first body portion being configured to be connected to a first light fixture having an elongated shape and at least one first lighting element;
- a second body portion being configured to be connected to a second light fixture having an elongated shape and at least one second lighting element;
- said first and second body portions being configured and disposed to be moved relative to one another to any angular orientation in a predetermined range of angular orientations to thereby orient first and second light fixtures in a desired angular position;
- a locking arrangement being configured to be placed in an open position to permit relative movement of said first and second body portions to any angular orientation in said predetermined range;
- said locking arrangement being configured to be placed in a lock position to lock said first and second body portions in place at any angular orientation in said predetermined range;
- said light fixture connector further comprises a passage configured and disposed to permit power wiring from a first light fixture to pass through said light fixture connector to a second light fixture to permit transfer of power from a single power source in a daisy chain or serial connection;
- said passage is configured to guide said wiring through said light fixture connector at any angular orientation of said first and second body portions in said predetermined range;
- said passage comprises:
  - a channel disposed in said first body portion, which channel comprises a first end and a second end;
  - a first opening disposed in said first body portion and connected to said first end of said channel; and
  - a second opening disposed in said second body portion and operatively connected to said second end of said channel;
- said first opening is disposed in a fixed position with respect to said first end of said channel to permit wiring to pass between said first opening and said first end of said channel at any angular orientation of said first and second body portions in said predetermined range;

said second opening is movable with respect to said second end of said channel; and said second opening has a width sufficient to maintain connection with said second end of said channel at any angular orientation of said first and second body portions in said predetermined range to permit said wiring to pass between said second opening and said second end of said channel at any angular orientation of said first and second body portions in said predetermined range.

2. The light fixture connector according to claim 1, wherein:

said first body portion comprises a first section having a substantially cylindrical shape and a second section having a substantially rectangular shape;

said second body portion comprises a third section having a substantially cylindrical shape and a fourth section having a substantially rectangular shape;

said first and third sections are rotatable about a central axis of rotation; and said first, cylindrical, section is aligned coaxially with said third, cylindrical, section and each is configured and disposed to present a continuous cylindrical outer surface at any angular orientation of said first and second body portions in said predetermined range.

3. The light fixture connector according to claim 2, wherein:

each of said second and fourth, rectangular, sections comprises first and second planar side surfaces configured and disposed to extend tangentially from the cylindrical outer surfaces of each of said first and third, cylindrical, sections to produce an appearance of a smooth, tangential transition between said planar side surfaces and said cylindrical outer surfaces at any angular orientation of said first and second body portions in said predetermined range;

said first and second planar side surfaces of each of said second and fourth, rectangular, sections are configured to be disposed in alignment with outer planar surfaces of first and second light fixtures to produce an appearance of a continuous planar surface at a connection point; and each of said second and fourth, rectangular, sections comprises an angled stop surface configured and disposed to extend inwardly from its second planar side surface and substantially radially to said central axis of rotation, which angled stop surfaces engage one another upon said first and second body portions being oriented at 90-degrees to one another.

4. The light fixture connector according to claim 3, wherein said locking arrangement comprises:

a locking structure comprising a head portion and a shaft portion;

a guide slot disposed in said first body portion and having a first width essentially the same as the diameter of said head portion;

a receiving hole disposed in said second body portion and configured to receive and hold an end of said shaft portion;

said locking structure is disposed to pass through said guide slot and into said receiving hole with said head portion disposed at least partially in said guide slot;

said guide slot comprises a shoulder at which said guide slot has a second width less than said first width and essentially the same as the diameter of said shaft portion;

said locking structure is axially movable toward said second body portion to bring said head portion into engagement with said shoulder and exert a clamping force to clamp together said first and second body portions at any angular orientation of said first and second body portions in said predetermined range;

said locking structure is axially movable away from said second body portion to bring said head portion out of engagement with said shoulder to permit said first and second body portions to be moved to any angular orientation of said first and second body portions in said predetermined range; and said guide slot is configured, upon relative rotational movement of said first and second body portions, to engage with said head portion of said locking structure to help maintain alignment of said first and second body portions and to limit the relative rotational movement such that said first and second body portions are not moved to an angular orientation outside of said predetermined range, which predetermined range is 90 degrees to 170 degrees.

5. The light fixture connector according to claim 1, in combination with a first light fixture and a second light fixture adjustably connected by said light fixture connector, wherein:

each of said first and second light fixtures comprises:

a housing being elongated and having a substantially H-shaped cross-sectional profile; and a lighting element being connected to said housing along a portion of the length of said housing;

said housing comprises a first side piece, a second side piece, and a crosspiece;

said crosspiece is configured and disposed to connect said first and second side pieces at a central portion thereof and to define said substantially H-shaped cross-sectional profile;

said crosspiece is configured and disposed to divide said housing into a first open chamber bordered by a first portion of said first side piece and a first portion of said second side piece, and a second open chamber bordered by a second portion of said first side piece and a second portion of said second side piece;

each of said first portions comprises a recess disposed at the ends of said first portions adjacent the opening into said first open chamber;

said lighting element comprises a first leg, a second leg, and a connecting portion disposed transverse to and to connect said first leg and said second leg;

said lighting element comprises a resilient material to permit temporary displacement of said first and second legs with respect to said connecting portion;

each of said first and second legs comprises a projection configured to essentially match said recesses in said first portions of said first and second side pieces of said housing, which projections are configured and disposed to engage and seat in said recesses to hold said lighting element in said housing in a snap-fit connection;

said first and second legs of said lighting element are configured to flex inwardly to permit manual movement of said lighting element into or out of said first open chamber in a direction essentially or substantially perpendicular to said crosspiece;

said crosspiece comprises at least one opening therein to permit insertion of a tool by a user through said second open chamber, through said crosspiece, into said first open chamber, and into contact with said connecting portion of said lighting element to permit a user to manually push said lighting element out of said first open chamber in a direction essentially or substantially perpendicular to said crosspiece;

each of said second portions of said first and second side pieces comprises a recess disposed at the ends of said second portions adjacent the opening into said second open chamber; and said recesses in said second open chamber are configured and disposed in a similar manner as said recesses in said first open chamber to permit snap-fit installation and connection of at least one of: another lighting element and a cover element.

6. The light fixture connector according to claim 5, in combination with said first light fixture and said second light fixture adjustably connected by said light fixture connector, wherein:

said light fixture connector comprises:

a first connector bracket configured and disposed to connect to said first light fixture; and a second connector bracket configured and disposed to connect to said second light fixture;

each of said first and second connector brackets comprises a clamping tab structure being configured and disposed to project into their respective second open chambers adjacent to or in contact with said second surfaces of said crosspieces;

each of said first and second light fixtures comprises a clamping device being mounted on said second surface of said crosspiece and configured to clamp onto said connector bracket;

said clamping device being disposed to be manually accessible to a user through the open end of said second open chamber;

said clamping device comprising:

a mounting portion being configured and disposed to mount said clamping device on said crosspiece; and a clamping portion being pivotably connected to said mounting portion; and said clamping portion being configured to be manually moved and pressed onto said clamping tab structure in a form fit and clamping engagement to permit manual connection of its light fixture and said light fixture connector without the use of tools; and said clamping portion being configured to be manually moved and pulled off of said clamping tab structure to disengage said clamping device from said clamping tab structure to permit manual disconnection of its light fixture and said light fixture connector without the use of tools.

7. The light fixture connector according to claim 1, wherein said locking arrangement comprises:

a locking structure comprising a head portion and a shaft portion;

a guide slot disposed in said first body portion and having a first width essentially the same as the diameter of said head portion;

a receiving hole disposed in said second body portion and configured to receive and hold an end of said shaft portion;

said locking structure is disposed to pass through said guide slot and into said receiving hole with said head portion disposed at least partially in said guide slot;

said guide slot comprises a shoulder at which said guide slot has a second width less than said first width and essentially the same as the diameter of said shaft portion;

said locking structure is axially movable toward said second body portion to bring said head portion into engagement with said shoulder and exert a clamping force to clamp together said first and second body portions at any angular orientation of said first and second body portions in said predetermined range;

said locking structure is axially movable away from said second body portion to bring said head portion out of engagement with said shoulder to permit said first and second body portions to be moved to any angular orientation of said first and second body portions in said predetermined range; and said guide slot is configured, upon relative rotational movement of said first and second body portions, to engage with said head portion of said locking structure to help maintain alignment of said first and second body portions and to limit the relative rotational movement such that said first and second body portions are not moved to an angular orientation outside of said predetermined range, which predetermined range is 90 degrees to 170 degrees.

8. A method of adjusting a light fixture connector according to claim 7, wherein said method comprises:

relatively moving said first and second body portions, while using the interaction of said head portion and said guide slot as a guide, to a first angular orientation corresponding to a first desired angular position of first and second light fixtures in a predetermined range of 90 degrees to 170 degrees;

placing said locking arrangement in said closed position by: axially moving said locking structure toward said second body portion, bringing said head portion into engagement with said shoulder, and exerting a clamping force to clamp and lock together said first and second body portions in said first angular orientation;

placing said locking arrangement in said open position by: axially moving said locking structure away from said second body portion, bringing said head portion out of engagement with said shoulder, and releasing said clamping force;

relatively moving said first and second body portions, while using the interaction of said head portion and said guide slot as a guide, to a second, different, angular orientation corresponding to a second, different, desired angular position of first and second light fixtures in a predetermined range of 90 degrees to 170 degrees; and placing said locking arrangement in said closed position to lock said first and second body portions in said second, different, angular orientation.

9. A light fixture connector configured to connect a first light fixture and a second light fixture in a light fixture arrangement configured to provide light to a portion of a commercial or residential building or an office or room within a commercial or residential building or structure, in combination with a first light fixture and a second light fixture adjustably connected by said light fixture connector, wherein said first light fixture has an elongated shape and at least one first lighting element, and said second light fixture has an elongated shape and at least one second lighting element, said light fixture connector comprising:

a first body portion being configured to be connected to a first light fixture having an elongated shape and at least one first lighting element;

a second body portion being configured to be connected to a second light fixture having an elongated shape and at least one second lighting element;

said first and second body portions being configured and disposed to be moved relative to one another to any angular orientation in a predetermined range of angular orientations to thereby orient first and second light fixtures in a desired angular position;

a locking arrangement being configured to be placed in an open position to permit relative movement of said first and second body portions to any angular orientation in said predetermined range;

said locking arrangement being configured to be placed in a lock position to lock said first and second body portions in place at any angular orientation in said predetermined range;

each of said first and second light fixtures comprises a housing being elongated and having a substantially H-shaped cross-sectional profile;

said lighting element is connected to said housing along a portion of the length of said housing;

said housing comprises a first side piece, a second side piece, and a crosspiece;

said crosspiece is configured and disposed to connect said first and second side pieces at a central portion thereof and to define said substantially H-shaped cross-sectional profile;

said crosspiece is configured and disposed to divide said housing into a first open chamber bordered by a first portion of said first side piece and a first portion of said second side piece, and a second open chamber bordered by a second portion of said first side piece and a second portion of said second side piece;

each of said first portions comprises a recess disposed at the ends of said first portions adjacent the opening into said first open chamber;

said lighting element comprises a first leg, a second leg, and a connecting portion disposed transverse to and to connect said first leg and said second leg;

said lighting element comprises a resilient material to permit temporary displacement of said first and second legs with respect to said connecting portion;

each of said first and second legs comprises a projection configured to essentially match said recesses in said first portions of said first and second side pieces of said housing, which projections are configured and disposed to engage and seat in said recesses to hold said lighting element in said housing in a snap-fit connection; and said first and second legs of said lighting element are configured to flex inwardly to permit manual movement of said lighting element into or out of said first open chamber in a direction essentially or substantially perpendicular to said crosspiece.

10. The light fixture connector according to claim 9, wherein:

said crosspiece comprises at least one opening therein to permit insertion of a tool by a user through said second open chamber, through said crosspiece, into said first open chamber, and into contact with said connecting portion of said lighting element to permit a user to manually push said lighting element out of said first open chamber in a direction essentially or substantially perpendicular to said crosspiece;

each of said second portions of said first and second side pieces comprises a recess disposed at the ends of said second portions adjacent the opening into said second open chamber; and said recesses in said second open chamber are configured and disposed in a similar manner as said recesses in said first open chamber to permit snap-fit installation and connection of at least one of: another lighting element and a cover element.

11. A light fixture connector configured to connect a first light fixture and a second light fixture in a light fixture arrangement configured to provide light to a portion of a commercial or residential building or an office or room within a commercial or residential building or structure, said light fixture connector comprising:

a first body portion being configured to be connected to a first light fixture having an elongated shape and at least one first lighting element;

a second body portion being configured to be connected to a second light fixture having an elongated shape and at least one second lighting element;

said first and second body portions being configured and disposed to be moved relative to one another to any angular orientation in a predetermined range of angular orientations to thereby orient first and second light fixtures in a desired angular position;

a locking arrangement being configured to be placed in an open position to permit relative movement of said first and second body portions to any angular orientation in said predetermined range;

said locking arrangement being configured to be placed in a lock position to lock said first and second body portions in place at any angular orientation in said predetermined range;

said light fixture connector comprises:

a first connector bracket configured and disposed to connect to the first light fixture; and a second connector bracket configured and disposed to connect to the second light fixture; and each of said first and second connector brackets comprises a clamping tab structure being configured and disposed to project into and connect to a respective one of the first and second light fixtures.

12. The light fixture connector according to claim 11, wherein:

the light fixture connector further comprises a first clamping device and a second clamping being mountable in a respective one of the first and second light fixtures;

each of said first and second clamping devices is configured to detachably clamp onto a respective one of said first and second connector brackets;

said clamping device comprising:

a mounting portion; and a clamping portion being pivotably connected to said mounting portion; and said clamping portion being configured to be manually moved and pressed onto said clamping tab structure in a form fit and clamping engagement to permit manual connection of its light fixture and said light fixture connector without the use of tools; and said clamping portion being configured to be manually moved and pulled off of said clamping tab structure to disengage said clamping device from said clamping tab structure to permit manual disconnection of its light fixture and said light fixture connector without the use of tools.

* * * * *